(12) United States Patent
Holman et al.

(10) Patent No.: US 6,831,769 B2
(45) Date of Patent: Dec. 14, 2004

(54) ELECTRO-OPTIC DISPLAY AND LAMINATION ADHESIVE

(75) Inventors: Mavyn M. Holman, Peabody, MA (US); Justin Abramson, Wayland, MA (US); Glen Crossley, Belmont, MA (US); Katharine Geramita, Cambridge, MA (US); Robert W. Zehner, Cambridge, MA (US); Karl R. Amundson, Cambridge, MA (US); Libing Zhang, Sharon, MA (US); Richard M. Webber, Brookline, MA (US)

(73) Assignee: E Ink Corporation, Cambridge, MA (US)

( * ) Notice: Subject to any disclaimer, the term of this patent is extended or adjusted under 35 U.S.C. 154(b) by 247 days.

(21) Appl. No.: 10/064,389

(22) Filed: Jul. 9, 2002

(65) Prior Publication Data

US 2003/0025855 A1 Feb. 6, 2003

Related U.S. Application Data
(60) Provisional application No. 60/304,117, filed on Jul. 9, 2001.

(51) Int. Cl.⁷ ............................ G02B 26/00; G02F 1/07; B32B 31/00
(52) U.S. Cl. ...................... 359/296; 359/290; 359/245; 156/250; 156/257
(58) Field of Search ................................ 359/296, 290, 359/238, 246, 245; 156/250, 257, 277

(56) References Cited

U.S. PATENT DOCUMENTS

| | | | |
|---|---|---|---|
| 2,800,457 A | 7/1957 | Green et al. | 428/402.2 |
| 3,668,106 A | 6/1972 | Ota | 358/305 |
| 3,756,693 A | 9/1973 | Ota | 345/107 |
| 3,767,392 A | 10/1973 | Ota | 430/35 |
| 3,792,308 A | 2/1974 | Ota | 315/150 |
| 3,870,517 A | 3/1975 | Ota et al. | 430/38 |
| 3,892,568 A | 7/1975 | Ota | 430/19 |
| 4,001,140 A | 1/1977 | Foris et al. | 427/213.34 |
| 4,273,672 A | 6/1981 | Vassiliades | 264/4.1 |
| 4,640,583 A | 2/1987 | Hoshikawa et al. | 349/153 |

(List continued on next page.)

FOREIGN PATENT DOCUMENTS

| | | |
|---|---|---|
| EP | 0 659 866 A2 | 6/1995 |
| JP | 02-223936 A | 9/1990 |
| JP | 02-284124 A | 11/1990 |

(List continued on next page.)

OTHER PUBLICATIONS

Amundson, K., et al., "Flexible, Active–Matrix Display Constructed Using a Microencapsulated Electrophoretic Material and an Organic–Semiconductor–Based Backplane", SID 01 Digest, 160 (Jun. 2001).

Comiskey, B., et al., "An electrophoretic ink for all–printed reflective electronic displays", Nature, 394, 253 (1998).

Comiskey, B., et al., "Electrophoretic Ink: A Printable Display Material", SID 97 Digest (1997), p. 75.

(List continued on next page.)

*Primary Examiner*—Georgia Epps
*Assistant Examiner*—Timothy Thompson
(74) *Attorney, Agent, or Firm*—David J. Cole

(57) ABSTRACT

An electro-optic display comprises first and second substrates and a lamination adhesive layer and a layer of a solid electro-optic material disposed between the first and second substrates, the lamination adhesive layer having a volume resistivity, measured at 10° C., which does not change by a factor of more than about 3 after being held at 25° C. and 45 percent relative humidity for 1000 hours. The electro-optic material is preferably an encapsulated electrophoretic material. Other desirable characteristics of lamination adhesives for use in electro-optic displays are also described.

66 Claims, 9 Drawing Sheets

U.S. PATENT DOCUMENTS

| | | | |
|---|---|---|---|
| 4,650,288 A | 3/1987 | White | 359/296 |
| 4,690,749 A | 9/1987 | Van Alstine et al. | 204/454 |
| 4,742,345 A | 5/1988 | DiSanto et al. | 345/107 |
| 4,892,607 A | 1/1990 | DiSanto et al. | 156/275.7 |
| 5,128,226 A | 7/1992 | Hung | 430/59.6 |
| 5,213,983 A | 5/1993 | Gustafsson et al. | 438/82 |
| 5,250,938 A | 10/1993 | DiSanto et al. | 345/107 |
| 5,302,235 A | 4/1994 | DiSanto et al. | 216/5 |
| 5,380,362 A | 1/1995 | Schubert | 106/493 |
| 5,403,518 A | 4/1995 | Schubert | 252/572 |
| 5,411,656 A | 5/1995 | Schubert | 345/107 |
| 5,460,688 A | 10/1995 | DiSanto et al. | 216/5 |
| 5,573,711 A | 11/1996 | Hou et al. | 252/572 |
| 5,627,561 A | 5/1997 | Laspina et al. | 345/107 |
| 5,635,317 A | 6/1997 | Taniguchi et al. | 430/7 |
| 5,686,383 A | 11/1997 | Long et al. | 503/227 |
| 5,688,584 A | 11/1997 | Casson et al. | 428/209 |
| 5,699,097 A | 12/1997 | Takayama et al. | 347/171 |
| 5,707,738 A | 1/1998 | Hou | 428/402 |
| 5,760,761 A | 6/1998 | Sheridon | 345/107 |
| 5,777,782 A | 7/1998 | Sheridon | 359/296 |
| 5,808,783 A | 9/1998 | Crowley | 359/296 |
| 5,891,366 A | 4/1999 | Gruenwald et al. | 252/514 |
| 5,930,026 A | 7/1999 | Jacobson et al. | 359/256 |
| 5,961,804 A | 10/1999 | Jacobson et al. | 204/606 |
| 5,972,493 A | 10/1999 | Iwasaki et al. | 428/323 |
| 6,017,584 A | 1/2000 | Albert et al. | 427/313.3 |
| 6,067,185 A | 5/2000 | Albert et al. | 359/296 |
| 6,113,810 A | 9/2000 | Hou et al. | 252/572 |
| 6,118,426 A | 9/2000 | Albert et al. | 345/107 |
| 6,120,588 A | 9/2000 | Jacobson | 106/31.16 |
| 6,120,839 A | 9/2000 | Comiskey et al. | 427/213.3 |
| 6,124,851 A | 9/2000 | Jacobson | 345/206 |
| 6,128,124 A | 10/2000 | Silverman | 359/296 |
| 6,130,773 A | 10/2000 | Jacobson et al. | 359/296 |
| 6,130,774 A | 10/2000 | Albert et al. | 359/296 |
| 6,136,128 A * | 10/2000 | Chung | 156/235 |
| 6,137,467 A | 10/2000 | Sheridon et al. | 345/107 |
| 6,147,791 A | 11/2000 | Sheridon | 359/296 |
| 6,177,921 B1 | 1/2001 | Comiskey et al. | 345/107 |
| 6,215,920 B1 | 4/2001 | Whitehead et al. | 385/18 |
| 6,225,971 B1 | 5/2001 | Gordon, II et al. | 345/107 |
| 6,232,950 B1 | 5/2001 | Albert et al. | 345/107 |
| 6,241,921 B1 | 6/2001 | Jacobson et al. | 264/1.36 |
| 6,249,271 B1 | 6/2001 | Albert | 345/107 |
| 6,252,564 B1 | 6/2001 | Albert | 345/1.3 |
| 6,262,706 B1 | 7/2001 | Albert | 345/107 |
| 6,262,833 B1 | 7/2001 | Loxley et al. | 359/296 |
| 6,271,823 B1 | 8/2001 | Gordon, II et al. | 345/107 |
| 6,300,932 B1 | 10/2001 | Albert | 345/107 |
| 6,301,038 B1 | 10/2001 | Fitzmaurice et al. | 359/265 |
| 6,312,304 B1 | 11/2001 | Duthaler et al. | 445/24 |
| 6,312,971 B1 | 11/2001 | Amundson et al. | 438/99 |
| 6,323,989 B1 | 11/2001 | Jacobson et al. | 359/296 |
| 6,327,072 B1 | 12/2001 | Comiskey et al. | 359/296 |
| 6,344,155 B1 * | 2/2002 | Kitahara et al. | 252/502 |
| 6,376,828 B1 | 4/2002 | Comiskey | 250/216 |
| 6,377,387 B1 | 4/2002 | Duthaler et al. | 359/296 |
| 6,392,786 B1 | 5/2002 | Albert | 359/296 |
| 6,413,790 B1 | 7/2002 | Duthaler et al. | 438/21 |
| 6,428,650 B1 * | 8/2002 | Chung | 252/502 |
| 6,445,489 B1 | 9/2002 | Jacobson et al. | 359/296 |
| 6,459,418 B1 | 10/2002 | Comiskey et al. | 345/107 |
| 6,473,072 B1 | 10/2002 | Comiskey et al. | 345/107 |
| 6,498,114 B1 | 12/2002 | Amundson et al. | 438/780 |
| 6,504,524 B1 | 1/2003 | Gates et al. | 345/107 |
| 6,506,438 B2 | 1/2003 | Duthaler et al. | 427/58 |
| 6,515,649 B1 | 2/2003 | Albert et al. | 345/107 |
| 6,531,997 B1 | 3/2003 | Gates et al. | 345/107 |
| 6,538,801 B2 | 3/2003 | Jacobson et al. | 359/296 |
| 2001/0030639 A1 | 10/2001 | Goden | 345/107 |
| 2001/0045934 A1 | 11/2001 | Turner et al. | 345/107 |
| 2002/0019081 A1 | 2/2002 | Denis et al. | 438/149 |
| 2002/0021270 A1 | 2/2002 | Albert | 345/84 |
| 2002/0053900 A1 | 5/2002 | Jacobson et al. | 324/100 |
| 2002/0060321 A1 | 5/2002 | Kazlas et al. | 257/66 |
| 2002/0063661 A1 | 5/2002 | Comiskey et al. | 345/55 |
| 2002/0063677 A1 | 5/2002 | Drzaic | 345/107 |
| 2002/0075556 A1 | 6/2002 | Liang et al. | 359/296 |
| 2002/0090980 A1 | 7/2002 | Wilcox et al. | 455/566 |
| 2002/0106847 A1 | 8/2002 | Kazlas et al. | 438/200 |
| 2002/0113770 A1 | 8/2002 | Jacobson et al. | 345/107 |
| 2002/0130832 A1 | 9/2002 | Baucom et al. | 345/107 |
| 2002/0131147 A1 | 9/2002 | Paolini, Jr. et al. | 359/296 |
| 2002/0154382 A1 | 10/2002 | Morrison et al. | 359/296 |
| 2002/0171910 A1 | 11/2002 | Pullen et al. | 359/296 |
| 2002/0180687 A1 | 12/2002 | Webber | 345/107 |
| 2002/0180688 A1 | 12/2002 | Drzaic et al. | 345/107 |
| 2002/0185378 A1 | 12/2002 | Honeyman et al. | 204/601 |

FOREIGN PATENT DOCUMENTS

| | | |
|---|---|---|
| JP | 02-284125 A | 11/1990 |
| JP | 05-143009 A | 6/1993 |
| JP | 05-307197 A | 11/1993 |
| JP | 06-118452 A | 4/1994 |
| JP | 2000-259102 | 9/2000 |
| JP | 2002-072258 | 3/2002 |
| WO | WO 00/05704 | 2/0000 |
| WO | WO 99/67678 | 12/1999 |
| WO | WO 00/20922 | 4/2000 |
| WO | WO 00/26761 | 5/2000 |
| WO | WO 00/36560 | 6/2000 |
| WO | WO 00/38000 | 6/2000 |
| WO | WO 00/38001 | 6/2000 |
| WO | WO 00/67110 | 11/2000 |
| WO | WO 00/67327 | 11/2000 |
| WO | WO 01/07961 | 2/2001 |
| WO | WO 01/08241 | 2/2001 |
| WO | WO 01/17029 | 3/2001 |
| WO | WO 01/27690 | 4/2001 |
| WO | WO 02/01281 | 1/2002 |

OTHER PUBLICATIONS

Drzaic, P., et al., "A Printed and Rollable Bistable Electronic Display", SID 98 Digest (1998), p. 1131.

Gutcho, M.H., Microcapsules and Microencapsulation Techniques, Noyes Data Corp., Park Ridge NJ, (1976).

Hou, J., et al., "Active Matrix Electrophoretic Displays Containing Black and White Particles with Opposite Polarities", SID 01 Digest, 164 (Jun. 2001).

Jacobson, J., et al., "The last book", IBM Systems J., 36, 457 (1997).

Ji, Y., et al., "P–50: Polymer Walls in Higher–Polymer–Content Bistable Reflective Cholesteric Displays", SID 96 Digest, 611 (1996).

Kazlas, P., et al., "12.1" SVGA Microencapsulation Electrophoretic Active Matrix Display for Information Applicances", SID 01 Digest, 152 (Jun. 2001).

Vandegaer, J.E. (ed.), "Microencapsulated Processes and Applications", pp. v–x, 1–180 (Plenum Press, New York 1974).

Wood, D., Information Display, 18(3), 24 (Mar. 2002).

Bach, U., et al., "Nanomaterials–Based Electrochromics for Paper–Quality Displays", Adv. Mater, 14(11), 845 (2002).

Ota, I., et al., "Developments in Electrophoretic Displays", Proceedings of the SID, 18, 243 (1977).

* cited by examiner

| Materials | Wt (g) | Wt% | MW | Mole | Mole% |
|---|---|---|---|---|---|
| PPO2000 | 50.00 | 0.653 | 2000.00 | 0.025 | 0.152 |
| DMPA | 3.35 | 0.044 | 134.13 | 0.025 | 0.152 |
| SnB2L2 | 0.04 | | 631.56 | | |
| NMP | 10.00 | | | | |
| H12MDI | 18.36 | 0.240 | 262.35 | 0.070 | 0.424 |
| TEA | 2.53 | 0.033 | 101.19 | 0.025 | 0.152 |
| H2O | 105.00 | | | | |
| HMDA | 2.32 | 0.030 | 116.21 | 0.020 | 0.121 |
| H2O in 50% HDA soln | 2.32 | | | | |

Theorectical polymer wt   76.57 g
Dispersion weight         193.94 g
Solids (%)                39.5%
NMP (%)                   5.2%

Fig 14

| Materials | Wt (g) | Wt% | MW | Mole | Mole% |
|---|---|---|---|---|---|
| PPO2000 | 50.00 | 0.673 | 2000.00 | 0.025 | 0.172 |
| DMPA | 3.35 | 0.045 | 134.13 | 0.025 | 0.172 |
| SnB2L2 | 0.04 | | 631.56 | | |
| NMP | 10.00 | | | | |
| H12MDI | 18.36 | 0.247 | 262.35 | 0.070 | 0.483 |
| TEA | 2.53 | 0.034 | 101.19 | 0.025 | 0.172 |
| H2O | 100.00 | | | | |

Polymer weight      74.25 g
Dispersion weight   184.29 g
Solids (%)          40.3%

Fig 15

ELECTRO-OPTIC DISPLAY AND LAMINATION ADHESIVE

CROSS REFERENCE TO RELATED APPLICATIONS

This application claims priority from Provisional Application Ser. No. 60/304,117, filed Jul. 9, 2001; the entire disclosure of this Provisional Application is herein incorporated by reference.

REFERENCED-APPLICATIONS

This application is also related to copending application Ser. No. 10/064,279, filed Jun. 28, 2002; the entire disclosure of this copending application is also herein incorporated by reference.

BACKGROUND OF INVENTION

This invention relates to electro-optic displays and to adhesive compositions for use therein. More specifically, this invention relates to adhesive compositions with properties, including mechanical, electrical, and chemical properties, which render them especially suitable for use in electro-optic displays, and which facilitate the manufacture of such displays and increase the useful life thereof. The adhesive compositions of the present invention may also be useful in applications other than electro-optic displays.

Electro-optic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.

The electro-optic displays of the present invention typically contain an electro-optic material which is a solid in the sense that the electro-optic material has solid external surfaces, although the material may, and often does, have internal liquid- or gas-filled spaces, and to methods for assembling displays using such an electro-optic material. Such displays using solid electro-optic materials may hereinafter for convenience be referred to as "solid electro-optic displays". Thus, the term "solid electro-optic displays" includes encapsulated electrophoretic displays, microcell electrophoretic displays and encapsulated liquid crystal displays.

One type of electro-optic display is the rotating bichromal member type as described, for example, in U.S. Pat. Nos. 5,808,783; 5,777,782 and 5.760,761 (this type of electro-optic medium is often referred to as a "rotating bichromal ball" medium, but the term "rotating bichromal member" is preferred since in some versions of the medium the rotating members are not spherical).

Another type of electro-optic medium is an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in International Applications Publication Nos. WO 98/35267 and WO 01/27690, and in copending applications Ser. Nos. 60/365,368; 60/365,369; 60/365,385 and 60/365,365, all filed Mar. 18, 2002, and applications Ser. Nos. 60/319,279; 60/319,280; and 60/319,281, all filed May 31, 2002; the entire contents of all these applications are herein incorporated by reference.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; and 6,413,790; U.S. patent applications Publication Nos. 2001-0045934; 2002-0018042; 2002-0019081; 2002-0021270; 2002-0053900; and 2002-0060321; and International Applications Publication Nos. WO 97/04398; WO 98/03896; WO 98/19208; WO 98/41898; WO 98/41899; WO 99/10767; WO 99/10768; WO 99/10769; WO 99/47970; WO 99/53371; WO 99/53373; WO 99/56171; WO 99/59101; WO 99/67678; WO 00/03349; WO 00/03291; WO 00/05704; WO 00/20921; WO 00/20922; WO 00/20923; WO 00/26761; WO 00/36465; WO 00/36560; WO 00/36666; WO 00/38000; WO 00/38001; WO 00/59625; WO 00/60410; WO 00/67110; WO 00/67327 WO 01/02899; WO 01/07691; WO 01/08241; WO 01/08242; WO 01/17029; WO 01/17040; WO 01/17041; WO 01/80287 and WO 02/07216. The entire disclosures of all these patents and published applications are herein incorporated by reference.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, WO 01/02899, at page 10, lines 6–19. See also copending application Ser. No. 09/683,903, filed Feb. 28, 2002, the entire disclosure of which is herein incorporated by reference, and the corresponding International Application PCT/US02/06393.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Applications Publication No. WO 02/01281, and published U.S. application Ser. No. 2002-0075556, both assigned to Sipix Imaging, Inc.

Other types of electro-optic materials, for example, polymer-dispersed liquid crystal, may also be used in the displays of the present invention.

In addition to the layer of electro-optic material, an electro-optic display normally comprises at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display useable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. (As discussed below, it may be desirable to produce the final lamination adhesive by blending multiple components. If this is done, it may be advantageous to allow the blended mixture to stand for some time before use to allow bubbles produced during blending to disperse.) However, vacuum lamination of the two parts of an electro-optic display in this manner imposes stringent requirements upon the lamination adhesive used, especially in the case of a display using an encapsulated electrophoretic medium. The lamination adhesive must have sufficient adhesive strength to bind the electro-optic layer to the layer (typically an electrode layer) to which it is to be laminated. The lamination adhesive must have adequate flow properties at the lamination temperature to ensure high quality lamination, and in this regard, the demands of laminating encapsulated electrophoretic and some other types of electro-optic media are unusually difficult; the lamination has be conducted at a temperature of not more than about 110° C. since the medium cannot be exposed to substantially higher temperatures without damage, but the flow of the adhesive must cope with the relatively uneven surface of the capsule-containing layer, the surface of which is rendered irregular by the underlying capsules. The lamination temperature should indeed be kept as low as possible, and room temperature lamination would be ideal, but no commercial adhesive has been found which permits such room temperature lamination. The lamination adhesive must be chemically compatible with all the other materials in the display. Solvent-based lamination adhesives should be avoided; it has been found (although this does not appear to have been described in the literature), that any solvent left behind in the adhesive after lamination has a strong tendency to introduce undesirable contaminants into the electro-optic medium.

It has also been found that a lamination adhesive used in an electro-optic display must meet a variety of electrical criteria, and this introduces considerable problems in the selection of the lamination adhesive. Commercial manufacturers of lamination adhesives naturally devote considerable effort to ensuring that properties, such as strength of adhesion and lamination temperatures, of such adhesives are adjusted so that the adhesives perform well in their major applications, which typically involve laminating polymeric and similar films. However, in such applications, the electrical properties of the lamination adhesive are not relevant, and consequently the commercial manufacturers pay no heed to such electrical properties. Indeed, the present inventors have observed substantial variations (of up to several fold) in certain electrical properties between different batches of the same commercial lamination adhesive, presumably because the manufacturer was attempting to optimize non-electrical properties of the lamination adhesive (for example, resistance to bacterial growth) and was not at all concerned about resulting changes in electrical properties.

However, in electro-optic displays, in which the lamination adhesive is normally located between the electrodes which apply the electric field needed to change the electrical state of the electro-optic medium, the electrical properties of the adhesive become crucial. As will be apparent to electrical engineers, the volume resistivity of the lamination adhesive becomes important, since the voltage drop across the electro-optic medium is essentially equal to the voltage drop across the electrodes, minus the voltage drop across the lamination adhesive. If the resistivity of the adhesive layer is too high, a substantial voltage drop will occur within the adhesive layer, requiring an increase in voltage across the electrodes. Increasing the voltage across the electrodes in this manner is undesirable, since it increases the power consumption of the display, and may require the use of more complex and expensive control circuitry to handle the increased voltage involved. On the other hand, if the adhesive layer, which extends continuously across the display, is in contact with a matrix of electrodes, as in an active matrix display, the volume resistivity of the adhesive layer should not be too low, or lateral conduction of electric current through the continuous adhesive layer may cause undesirable cross-talk between adjacent electrodes. Also, since the volume resistivity of most materials decreases rapidly with increasing temperature, if the volume resistivity of the adhesive layer is too low, the performance of the display at temperatures substantially above room temperature is adversely affected. For these reasons, there is an optimum range of lamination adhesive resistivity values for use with any given electro-optic medium, this range varying with the resistivity of the electro-optic medium. The volume resistivities of encapsulated electrophoretic media are typically around $10^{10}$ ohm cm, and the resistivities of other electro-optic medium are usually of the same order of magnitude. Accordingly, the volume resistivity of the lamination adhesive should normally be around $10^8$ to $10^{12}$ ohm cm, and preferably about $10^9$ to $10^{11}$ ohm cm, at the operating temperature of the display, typically around 20° C.

While it may be apparent that there should be a relationship between the volume resistivities of the electro-optic medium and the lamination adhesive used in an electro-optic display, the present inventors have discovered that other problems which have been observed in the operation of electro-optic displays, but which have not previously been understood, are attributable to the electrical and related properties of the lamination adhesive. For example, although the number of commercial materials which can meet most of the previously discussed, rather disparate requirements for a lamination adhesive for use in an electro-optic display is small, in practice it has been found that a small number of water-dispersed urethane emulsions, primarily polyester-based urethane emulsions, do appear to have most of the requisite properties. However, although these materials perform well when the displays are first produced, after the resultant displays have been operated for substantial periods of time (of the order of hundreds of hours) at room temperature, or stored for a similar period, the performance of the display suffers substantial degradation. This degradation first manifests itself as reduced white state reflectivity and slower or incomplete switching of the electro-optic medium, especially in areas where the lamination adhesive is thickest; the thickness of the lamination adhesive may vary across the display both because of a non-planar electro-optic layer, as for example in an encapsulated electrophoretic medium where the spherical or ellipsoidal capsules introduce deviations from planarity, and/or because the manufacturing process normally used to produce the electrode matrix in such displays produces a non-planar surface on the electrode matrix. This degradation increases at lower temperatures (10° C. or below) and with time, so that after long periods the switching of the whole display is affected at room temperature. This degradation in optical performance with time is an important factor in limiting the service life of the displays.

The present inventors have discovered that the aforementioned degradation in performance is caused, at least in part, by changes in the volume resistivity of the lamination adhesive, and that this performance degradation of electrophoretic displays can be reduced or eliminated, and the service life of such displays increased, by using an adhesive the resistivity of which does not vary greatly with time; it appears that similar effects are produced in other types of electro-optic displays. The use of such an adhesive has also been found to improve the performance of the displays at low temperature, as manifested by improved reflectance in the light optical state of the display.

Accordingly, in one aspect the present invention seeks to provide electro-optic displays having optical characteristics which do not change rapidly with time, so that the displays have an improved operating lifetime.

Other problems known to occur in electro-optic displays, but which have not previously been explained, include degradation of the performance of the display with increasing temperature, even when the display is first produced, as manifested, inter alia, by a reduction in the contrast ratio of the display (the relative reflectance or optical transmission of the two extreme optical states of the display) with increasing temperature, the similar degradation of the performance of the display with increasing humidity, and the phenomenon known as "self-erasing". See, for example, Ota, I., et al., "Developments in Electrophoretic Displays", Proceedings of the SID, 18, 243 (1977), where self-erasing was reported in an unencapsulated electrophoretic display. When the voltage applied across certain electrophoretic displays is switched off, the electrophoretic medium may reverse its optical state, and in some cases a reverse voltage, which may be larger than the operating voltage, can be observed to occur across the electrodes. It appears (although this invention is in no way limited by this belief) that the self-erasing phenomenon is due to a mismatch in electrical properties between various components of the display. Obviously, self-erasing is highly undesirable in that it reverses (or otherwise distorts, in the case of a grayscale display) the desired optical state of the display. It has been found that all of these problems may be attributable, at least in part, to changes in the electrical properties of the lamination adhesives with various environmental conditions, and that all can be reduced or eliminated by careful selection of the properties of the lamination adhesives used.

Accordingly, the present invention also seeks to provide lamination adhesives that can be used in the lamination of electro-optic displays at relatively low temperatures which do not adversely affect the electro-optic medium.

The present invention also seeks to provide an electro-optic display with a lamination adhesive having optimal mechanical properties.

The present invention also seeks to provide an electro-optic display with a lamination adhesive having optimal electrical properties.

In summary, the present invention seeks to provide a lamination adhesive with combined manufacturing, mechanical, electrical, environmental, chemical and temporal stability properties optimally suited for use in electro-optic displays.

The present invention also seeks to provide a novel polyurethane composition having properties which render it very suitable for use as a lamination adhesive in electro-optic displays.

SUMMARY OF INVENTION

Accordingly, in one aspect this invention provides an electro-optic display comprising first and second substrates and a lamination adhesive layer and a layer of a solid electro-optic material disposed between the first and second substrates. The lamination adhesive layer has a volume resistivity, measured at 10° C., which does not change by a factor of more than about 3 after being held at 25° C. and 45 percent relative humidity for 1000 hours. This form of the invention may hereinafter for convenience be referred to as the "resistivity stability" invention.

This invention also provides a process for preparing an electro-optic display. In this process, there is provided a first subassembly comprising an electro-optic layer and a first substrate, and a second subassembly comprising a second substrate, at least one of the subassemblies comprising an electrode. The two subassemblies are laminated to one another using a lamination adhesive so that the electro-optic layer is disposed between the first and second substrates, the lamination adhesive having a volume resistivity, measured at 10° C., which does not change by a factor of more than about 3 after being held at 25° C. and 45 percent relative humidity for 1000 hours.

This invention also provides an electro-optic display comprising first and second substrates, and a lamination adhesive layer and a layer of solid electro-optic material disposed between the first and second substrates. The lamination adhesive has any one or more of the following properties:

(a) having a volume resistivity, measured at 10° C., which does not change by a factor of more than about 3 after being at 25° C. and 45 percent relative humidity for 1000 hours;

(b) having a peel strength from an electrode material in contact with the lamination adhesive of at least about 2 lb/inch;

(c) the volume resistivity of the lamination adhesive changes by a factor of less than about 10 within a range of 10 to 90 percent relative humidity and over a temperature range of 10 to 50° C.;

(d) the lamination adhesive has a thickness in the range of about 10 to about 20 μm;

(e) the lamination adhesive has a shear modulus at 120° C. of not more than about 1 megaPascal;

(f) the product of the dielectric constant and the volume resistivity of the lamination adhesive is not greater than the product of the dielectric constant and the volume resistivity of the electro-optic medium within a range of 10 to 90 percent relative humidity and over a temperature range of 10 to 50° C.;

(g) comprising an ultra-violet stabilizer;

(h) comprising a light absorbing material.

This invention also provides a process for preparing an electro-optic display. In this process, there is provided a first subassembly comprising an electro-optic layer and a first substrate, and a second subassembly comprising a second substrate, at least one of the subassemblies comprising an electrode. The two subassemblies are laminated to one another using a lamination adhesive so that the electro-optic layer is disposed between the first and second substrates. The lamination adhesive has any one or more of the following properties:

(a) having a volume resistivity, measured at 10° C., which does not change by a factor of more than about 3 after being held at 25° C. and 45 percent relative humidity for 1000 hours;

(b) having a peel strength from an electrode material in contact with the lamination adhesive of at least about 2 lb/inch;

(c) the volume resistivity of the lamination adhesive changes by a factor of less than about 10 within a range of 10 to 90 percent relative humidity and over a temperature range of 10 to 50° C.;

(d) the lamination adhesive has a thickness in the range of about 10 to about 20 μm;

(e) the lamination adhesive has a shear modulus at 120° C. of not more than about 1 megapascal;

(f) the product of the dielectric constant and the volume resistivity of the lamination adhesive is not greater than the product of the dielectric constant and the volume resistivity of the electro-optic medium within a range of 10 to 90 percent relative humidity and over a temperature range of 10 to 50° C.;

(g) comprising an ultra-violet stabilizer;

(h) comprising a light absorbing material.

This invention also provides an electrophoretic display comprising first and second substrates, and a lamination adhesive layer and a layer of electrophoretic material disposed between the first and second substrates. The electrophoretic material comprises a plurality of capsules, each capsule comprising a capsule wall and an internal phase encapsulated within the capsule wall, the internal phase comprising electrically charged particles suspended in a suspending fluid and capable of moving through the fluid on application of an electric field to the electrophoretic material. The lamination adhesive has any one or more of the following properties:

(i) the product of the dielectric constant and the volume resistivity of the lamination adhesive is from about 0.01 to about 100 times the product of the dielectric constant and the volume resistivity of the suspending fluid;

(j) the ratio of the dielectric constant of the lamination adhesive to the dielectric constant of the suspending fluid within the temperature range of from 10 to 50° C. does not vary from this ratio at 25° C. by more than about 2 percent;

(k) the ratio of the volume resistivity of the lamination adhesive to the volume resistivity of the suspending fluid within the temperature range of from 10 to 50° C.

does not vary from this ratio at 25° C. by more than a factor of about 100;

(l) the solubility of the suspending fluid in the lamination adhesive does not exceed about 1 percent weight/weight over the range of 10 to 50° C.;

(m) being substantially free from mobile species.

This invention also provides a process for preparing an electrophoretic display. In this process there is provided a first subassembly comprising a first substrate and a layer of an electrophoretic medium comprising a plurality of capsules, each capsule comprising a capsule wall and an internal phase encapsulated within the capsule wall, the internal phase comprising electrically charged particles suspended in a suspending fluid and capable of moving through the fluid on application of an electric field to the electrophoretic medium, There is also provided a second subassembly comprising a second substrate; at least one of the subassemblies comprises an electrode. The two subassemblies are laminated to one another with a lamination adhesive so that the electro-optic layer is disposed between the first and second substrates. The lamination adhesive has any one or more of the following properties:

(i) the product of the dielectric constant and the volume resistivity of the lamination adhesive is from about 0.01 to about 100 times the product of the dielectric constant and the volume resistivity of the suspending fluid;

(j) the ratio of the dielectric constant of the lamination adhesive to the dielectric constant of the suspending fluid within the temperature range of from 10 to 50° C. does not vary from this ratio at 25° C. by more than about 2 percent;

(k) the ratio of the volume resistivity of the lamination adhesive to the volume resistivity of the suspending fluid within the temperature range of from 10 to 50° C. does not vary from this ratio at 25° C. by more than a factor of about 100;

(l) the solubility of the suspending fluid in the lamination adhesive does not exceed about 1 percent weight/weight over the range of 10 to 50° C.;

(m) being substantially free from mobile species.

Finally, this invention provides a microcell electrophoretic display comprising a substrate having a plurality of closed cavities formed therein, said cavities being at least partially filled with a electrophoretic medium comprising a plurality of electrically charged particles suspended in a suspending fluid and capable of moving therethrough on application of an electric field to the electrophoretic medium, the microcell electrophoretic display further comprising at least one electrode and a layer of lamination adhesive disposed between the cavities and the electrode, the lamination adhesive being characterized by any one or more of the following:

(a) having a volume resistivity, measured at 10° C., which does not change by a factor of more than about 3 after being held at 25° C. and 45 percent relative humidity for 1000 hours;

(b) having a peel strength from an electrode material in contact with the lamination adhesive of at least about 2 lb/inch;

(c) the volume resistivity of the lamination adhesive changes by a factor of less than about 10 within a range of 10 to 90 percent relative humidity and over a temperature range of 10 to 50° C.;

(d) the lamination adhesive has a thickness in the range of about 10 to about 20 µm;

(e) the lamination adhesive has a shear modulus at 120° C. of not more than about 1 megaPascal;

(f) the product of the dielectric constant and the volume resistivity of the lamination adhesive is not greater than the product of the dielectric constant and the volume resistivity of the electro-optic medium within a range of 10 to 90 percent relative humidity and over a temperature range of 10 to 50° C.;

(g) comprising an ultra-violet stabilizer;

(h) comprising a light absorbing material;

(i) the product of the dielectric constant and the volume resistivity of the lamination adhesive is from about 0.01 to about 100 times the product of the dielectric constant and the volume resistivity of the suspending fluid;

(j) the ratio of the dielectric constant of the lamination adhesive to the dielectric constant of the suspending fluid within the temperature over the range of from 10 to 50° C. does not vary from this ratio at 25° C. by more than about 2 percent;

(k) the ratio of the volume resistivity of the lamination adhesive to the volume resistivity of the suspending fluid within the temperature over the range of from 10 to 50° C. does not vary from this ratio at 25° C. by more than a factor of about 100;

(l) the solubility of the suspending fluid in the lamination adhesive does not exceed about 1 percent weight/weight over the range of 10 to 50° C.;

(m) being substantially free from mobile species.

BRIEF DESCRIPTION OF DRAWINGS

FIGS. 14 and 15 list the reagents used to produce certain polyurethanes produced in Example 7 below.

DETAILED DESCRIPTION

Figure 1:
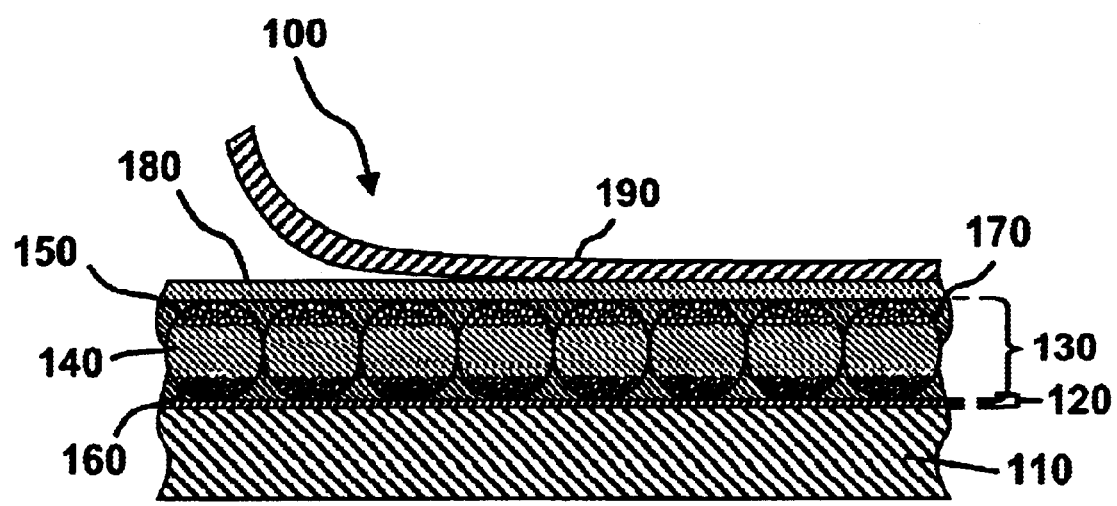
FIG. 1 of the accompanying drawings is a schematic section through one subassembly used in a process of the present invention, this subassembly comprising a substrate, a conductive layer, an electro-optic layer and an adhesive layer, the subassembly being illustrated at an intermediate stage of the process before this subassembly is laminated to a second subassembly.

Before describing the various aspects of the present invention in detail, it is considered desirable to explain in more detail the processes in which a lamination adhesive is used in the manufacture of an electro-optic display. As already explained, in a typical process, two subassemblies are first manufactured, one subassembly comprising an electro-optic layer and a first substrate, and the second comprising a second substrate; at least one of the subassemblies, and typically both, comprise an electrode. Also as already indicated, in one common form of such a process, used for manufacturing an active matrix display, one subassembly comprises a substrate, a single continuous ("common") electrode which extends across multiple pixels, and typically the whole, of the display, and the electro-optic layer, while the second assembly (usually referred to as the "backplane") comprises a substrate, a matrix of pixel electrodes, which define the individual pixels of the display, and non-linear devices (typically thin film transistors) and other circuitry used to produce on the pixel electrodes the potentials needed to drive the display (i.e., to switch the various pixels to the optical states necessary to provide a desired image on the display). The lamination adhesive is provided between the first and second subassemblies and adheres them together to form the final display.

In theory, if one could find a lamination adhesive with the necessary physical and mechanical properties, one could bring the two assemblies and the lamination adhesive together and form the display in a single operation, for example by feeding the three components from separate rolls and performing the lamination on a roll-to-roll basis. However, in the present state of the art this is not practicable, and normally the lamination adhesive is first applied to one of the two subassemblies, and thereafter the subassembly/adhesive combination is laminated to the other subassembly to form the final display. The lamination adhesive may be applied to either subassembly, but in general it is preferred that it be applied to the subassembly containing the electro-optic medium. As already mentioned, certain electro-optic media can be applied by printing or coating techniques on rigid or flexible substrates, and hence can be applied to flexible substrates, such as polymeric films, inexpensively by roll-to-roll processes. As discussed in copending application Ser. No. 60/319,300, filed Jun. 10, 2002 (the entire disclosure of this copending application is herein incorporated by reference), coating an electro-optic medium on to a flexible substrate in this manner, then covering the electro-optic medium with a lamination adhesive and a release sheet, provides a so-called "front plane laminate" which can then be cut as desired to produce portions suitable for lamination to a wide variety of backplanes. Applying the lamination adhesive to the backplane tends to be less convenient (although the present invention does not exclude this possibility), since in the present state of technology most backplanes are prepared on rigid substrates which are in the form of individual sheets less convenient for coating.

Regardless of which subassembly receives the lamination adhesive, there are two main variants of the adhesive application process, namely direct and indirect processes. As described in more detail below, lamination adhesives are typically supplied as liquid or semi-solid solutions or dispersions, which need to be converted (either by removal of a solvent or dispersant or by some other form of curing) to a substantially solid layer before the actual lamination. In a direct process, the lamination adhesive is applied directly to one subassembly and converted to the solid layer thereon. In an indirect process, the lamination adhesive is applied to a release sheet, converted to a solid layer on this release sheet, and then transferred, typically using heat and/or pressure, to one subassembly. Finally, the release sheet is removed from the solid layer of lamination adhesive before the final lamination to the other subassembly. In general, indirect methods are preferred over direct, since many commercial lamination adhesives contain relatively mobile species, such as organic solvents and/or free monomers, which may adversely affect either the electro-optic medium or the circuitry of the backplane, depending upon the subassembly to which the adhesive is applied. An indirect process, by permitting these relatively mobile species to be removed by drying or similar processes while the lamination adhesive is still on the release sheet, avoids the adverse effects of bringing these relatively volatile materials into contact with the electro-optic medium or circuitry of the backplane.

A preferred lamination process of the present invention will now be described, though by way of illustration only, with reference to FIG. 1 of the accompanying drawings, which, as already mentioned, is a schematic section through one subassembly (a front plane laminate, or FPL) used in a process of the present invention, this subassembly comprising a substrate, a conductive layer, an electro-optic layer and an adhesive layer, the subassembly being illustrated at an intermediate stage of the process before this subassembly is laminated to a second subassembly.

The front plane laminate (generally designated 100) shown in FIG. 1 comprises a light-transmissive substrate 110, a light-transmissive electrode layer 120, an electro-optic layer 130, a lamination adhesive layer 180 and a release sheet 190; the release sheet is illustrated in the process of being removed from the lamination adhesive layer 180 preparatory to lamination of the FPL 100 to a backplane.

The substrate 110 is typically a transparent plastic film, such as a 7 mil (177 $\mu$m) polyethylene terephthalate (PET) sheet. The lower surface (in FIG. 1) of substrate 110, which forms the viewing surface of the final display, may have one or more additional layers (not shown), for example a protective layer to absorb ultra-violet radiation, barrier layers to prevent ingress of oxygen or moisture into the final display, and anti-reflection coatings to improve the optical properties of the display. Coated onto the upper surface of substrate 110 is the thin light-transmissive electrically conductive layer 120, preferably of indium tin oxide (ITO), which acts as the common front electrode in the final display. PET films coated with ITO are available commercially.

The electro-optic layer 130 is deposited on the conductive layer 120, typically by slot coating, the two layers being in electrical contact. The electro-optic layer 130 shown in FIG. 1 is an encapsulated electrophoretic medium and comprises microcapsules 140, each of which comprises negatively charged white particles 150 and positively charged black particles 160 suspending in a hydrocarbon-based suspending fluid 165. The microcapsules 140 are held retained within a polymeric binder 170. Upon application of an electrical field across electro-optic layer 130, white particles 150 move to the positive electrode and black particles 160 move to the negative electrode, so that electro-optic layer 130 appears, to an observer viewing the display through substrate 110, white or black depending on whether conductive layer 120 is positive or negative relative to the adjacent pixel electrode in the backplane.

The FPL 100 is desirably prepared by coating the lamination adhesive 180, in liquid form, conveniently by slot coating, on to release sheet 190, drying (or otherwise curing) the adhesive to form a solid layer and then laminating the adhesive and release sheet to the electro-optic layer 130, which has previously been coated on to the substrate 110 bearing the conductive layer 120; this lamination may conveniently be effected using hot roll lamination. (Alternatively, but less desirably, the lamination adhesive may be applied over the electro-optic layer 130 and there dried or otherwise cured before being covered with the release sheet 190.) The release sheet 190 is conveniently a 7 mil (177 $\mu$m) film; depending upon the nature of the electro-optic medium used, it may be desirable to coat this film with a release agent, for example a silicone. As illustrated in FIG. 1, the release sheet 190 is peeled or otherwise removed from the lamination adhesive 180 before the FPL 100 is laminated to a backplane (not shown) to form the final display.

In the case of the preferred aqueous polyurethane dispersions for use in the present invention (see below) drying of the coating on the release sheet for about 10 minutes in air at 50° C. typically gives a sufficiently dry coating.

Having thus summarized the way in which the lamination adhesive is used to form the electro-optic displays of the present invention, we now turn to describing in detail the preferred characteristics of the lamination adhesive itself. As already mentioned, the present invention has several aspects, and any specific display of the invention may incorporate any one or more of these aspects. However, for ease of comprehension, the following aspects of the invention will be described separately hereinafter:

(i) Storage stability;
(ii) Light resistance and control;
(iii) Mechanical properties;
(iv) Electrical properties; and
(v) Physico-chemical properties.

It will readily be apparent that the optimum properties for the lamination adhesive used in an electro-optic display will vary somewhat with the exact type of electro-optic medium in the display, and the following discussion does not purport to specify an exhaustive list of such optimum properties for all types of electro-optic displays. However, the structure of an encapsulated electrophoretic display, in which electrically charged particles move through an internal phase which is itself confined by a capsule wall and (typically) a polymeric binder, does impose upon the lamination adhesive used in such an encapsulated electrophoretic display requirements in addition to those common to all electro-optic displays. In particular, certain of the optimum electrical properties are peculiar to encapsulated electrophoretic displays, as are the optimum physico-chemical properties discussed below. In this regard, depending upon the material in which the microcells are formed, microcell electrophoretic displays may typically impose substantially the same requirements as encapsulated electrophoretic displays, since both types of electrophoretic display use the same types of suspending fluids, and as discussed below the additional requirements for electrophoretic displays relate to relationships between the properties of the suspending fluid and the lamination adhesive.

Section (i): Resistivity Stability

As already mentioned, the present inventors have discovered that the degradation in performance of electro-optic displays with time is caused, at least in part, by changes in the volume resistivity of the lamination adhesive, and that this degradation can be reduced, and the service life of the displays increased, by using a lamination adhesive the volume resistivity of which does not vary greatly with time. In particular, the lamination adhesive should have a volume resistivity, measured at 10° C., which does not change by a factor of more than about 3 after being held at 25° C. and 45 percent relative humidity for 1000 hours.

The phrase "being held" is deliberately used to stress that, in testing lamination adhesives to determine whether they conform to the requirements of this aspect of the present invention, care should be taken to ensure that the lamination adhesive does equilibrate with the specified atmosphere within a reasonable time. If an adhesive is tested in thick layers, it may not equilibrate with the specified atmosphere for a considerable period and misleading results may be obtained. Such misleading results can be avoided by testing successively thinner layers of the adhesive and checking that the results are consistent. For sufficiently thin layers, merely storing the adhesive under the specified conditions for the specified period will suffice.

It is believed (although the invention is in no way limited by this belief) that the change in volume resistivity experienced in many lamination adhesives is due to partial crystallization of the adhesive, and that adhesives which meet the resistivity stability test defined above are substantially non-crystallizing. Those skilled in polymer technology are of course aware that partial or complete crystallization of polymers occurs in a variety of contexts and often produces substantial changes in a variety of physico-chemical properties of the polymers. Often, such changes can be reduced or eliminated by adding a plasticizer to the polymer. However, the addition of a plasticizer is usually not practicable in lamination adhesives used in electro-optic displays, since almost all conventional plasticizers are small molecules with substantial affinity for organic solvents, and the addition of such a material to the lamination adhesive will result in migration of the plasticizer into the electro-optic layer, with adverse effects upon the performance of that layer. Cf. the discussion below regarding the importance of avoiding mobile species in the lamination adhesive.

Alternative tests for non-crystallization, which in practice normally give substantially the same results as the resistivity stability test already defined, are a change in the enthalpy associated with any phase transition in the material, as measured by differential scanning calorimetry, that is not more than about 2 Joules per gram after being held at 25° C. and 45 percent relative humidity for 1000 hours, or a change in dielectric constant of less than about 2 after the same period of storage. Desirably, the lamination adhesive used in the present invention will meet all three tests.

The stable resistivity adhesive used in the present display and process could, at least in theory, be a single material, and indeed it may be possible, by custom design of polymers as discussed below, to produce a lamination adhesive which meets the resistivity stability requirement, as well as all the other requirements for a lamination adhesive for use in electro-optic displays, as discussed above. However, to date the present inventors have been unable to locate any commercial adhesive which itself meets the resistivity stability requirement and the other requirements. Accordingly, the presently preferred adhesives for use in the present invention are blends of two or more materials. Such a blend may comprise one or more lamination adhesives and one or more polymeric additives which are not themselves lamination adhesives. However, in order to obtain the best lamination adhesion properties, it is preferred that the blend used comprise at least two lamination adhesives. Such a blend may comprise a mixture of a first lamination adhesive which has unstable resistivity (but which has other properties which render it desirable) and a second lamination adhesive which does have stable resistivity, but whose other properties, such as inadequate adhesion, render it unsuitable for use alone. However, it has been found that certain stable resistivity blends can be formed from two or more lamination adhesives which do not have stable resistivities, and some of the presently preferred adhesive blends are of this type.

It may seem strange that a stable resistivity blend can be formed from two or more lamination adhesives each of which individually does not possess stable resistivity; however, this is explicable given that unstable resistivity is believed to be associated with partial crystallization within the adhesive, and the present understanding of the partial crystallization of polymers. Although the invention is in no way limited by this belief, skilled polymer chemists attribute partial crystallization of a polymer to the tendency for polymer chains to become aligned with one another, thus forming crystalline regions within the polymer. If two polymers, both of which are susceptible to the formation of such crystalline regions when in their pure form, but have somewhat different chemical structures, are blended, the two different polymer chains present in the blend may interfere with each other, preventing either type of polymer chain forming its crystalline regions, and thus rendering the blend non-crystallizing.

As should be apparent, it is desirable that the volume resistivity of the adhesive used in the present invention be as stable as possible throughout the working life of the display. However, empirically (as illustrated in the Examples in this Section) it has been found that the major part of the changes in volume resistivity of adhesives occurs during the first 1000 hours of life, so that a lamination adhesive which meets the stable resistivity test already mentioned will normally maintain a stable resistivity over a working life substantially greater than 1000 hours, and typically at least 10,000 hours. It is desirable that the volume resistivity of the adhesive not change by a factor of more than about 2, and preferably not greater than about 1.5, under the 1000 hour test previously described.

Commercial lamination adhesives which have been found useful in the display and process of the present invention include NeoRez R 9000, R 9314 and R 9320 (all available from NeoResins, 730 Main Street, Wilmington, Mass. 01887) and Dispercoll U KA 8713, U 53 and U 54 (all available from Bayer Corporation, 100 Bayer Road, Pittsburgh Pa. 15205-9741). All of these materials are water-dispersed urethane adhesives. R 9320 is a non-ionically stabilized polyester-based urethane, while U KA 8713 is an anionically-stabilized polyester urethane. Specific preferred blends are R 9320 with any one of the following (the following percentages are based on the total weight of the blend):

25–50% of U KA 8713
50% of R 9000
10–50% of R 9314
25–50% of U 53
50% of U 54.

No special techniques are required for forming the blends; the two or more components are simply mixed in conventional mixing equipment for a period sufficient to form an intimate mixture of the components. Attention must of course be paid to the chemical compatibility of the various components of the blend, especially the chemical compatibility of the dispersants present, since (as is well known to polymer chemists) admixing certain types of dispersants is highly likely to result in undesirable precipitation of the polymers.

Using a lamination adhesive with volume resistivity (and preferably other properties) which are stable upon long term storage also assists in ensuring economical manufacture of the display. As already discussed, for commercial reasons, it is convenient to prepare a front plane laminate of the form shown in FIG. 1 comprising a substrate, a conductive layer, an electro-optic layer, a lamination adhesive and a release sheet; this front plane laminate may be prepared in large batches, preferably using a roll-to-roll process, stored and later cut into portions suitable for lamination to the backplanes of individual displays before lamination to form such displays. For economical operation of such a manufacturing process, it is necessary that the lamination adhesive remain stable during the storage period in order that portions may be cut from the large batch at different times over a period of (say) several months to one year and laminated in a consistent manner to the backplanes to form the final displays.

The following Examples are now given, though by way of illustration only, to show details of preferred materials, processes and techniques used in the stable resistivity invention.

EXAMPLE 1

This Example illustrates the improved stability of the volume resistivity of the aforementioned R 9320 upon prolonged storage provided by blending the material with the aforementioned U KA 8713.

Figure 2:
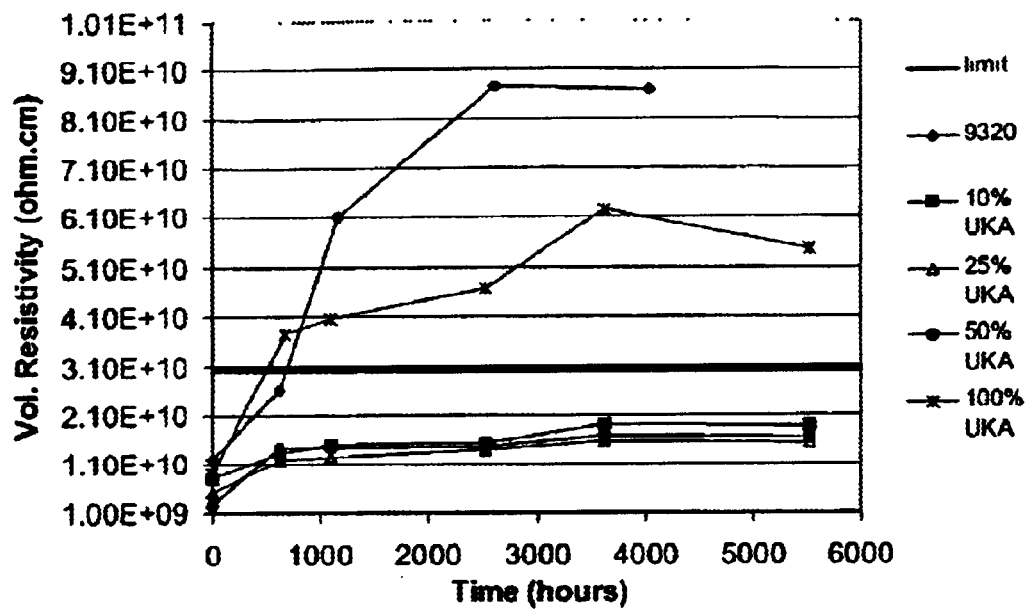
FIG. 2 is a graph illustrating the improved stability on storage of the volume resistivity of a lamination adhesive achieved by blending two commercial materials, as described in Example 1 below.

Test samples, using pure R 9320 and U KA 8713, and 90/10, 75/25 and 50/50 w/w percent blends of these two materials, were prepared in the following manner. The adhesive blend, adjusted to 40% solids content, was coated, using a doctor blade set at 150 µm, on to a 5 mil (127 µm) sheet of indium-tin-oxide (ITO)-coated polyester masked on one edge, so that the masked area could later serve as an electrode. The resultant coating was dried in an oven at 50° C. for 20 minutes to produce a dry film approximately 60 µm thick. The resultant adhesive-coated film was then laminated, by vacuum or roll lamination, to a second sheet of ITO-coated polyester so that the adhesive was in contact with both ITO layers. The samples thus prepared were stored at ambient temperature and humidity for 2500 hours. The electrical properties of the adhesive were measured by impedance spectroscopy at 10° C. at intervals using a Solartron SI 1260 Impedance/Gain-phase analyzer with a Solartron 1296 dielectric interface. The results are shown in FIG. 2 of the accompanying drawings. The horizontal line at $3 \times 10^{10}$ ohm cm represents an empirical limit for the maximum volume resistivity of a lamination adhesive useful in a preferred embodiment of an encapsulated electrophoretic display formed as described in the aforementioned E Ink and MIT patents and applications.

From FIG. 2, it will be seen that the volume resistivities of both R 9320 and U 8713 changed substantially over the storage period, the volume resistivity of the former increasing from about $10^{10}$ to about $9 \times 10^{10}$ ohm cm, while the latter rose from an initial $1 \times 10^{10}$ ohm cm to almost $5 \times 10^{10}$ ohm cm. In contrast, the volume resistivities of all three blends were substantially more stable over the test period, all falling within the range of about $1-1.5 \times 10^{10}$ ohm cm over the period of 500–2500 hours of storage.

EXAMPLE 2

This Example illustrates the improved stability of the volume resistivity and dielectric constant of the aforementioned R 9320 upon prolonged storage provided by blending the material with the aforementioned R 9000.

Example 1 was repeated, except that R 9000 was substituted for U KA 8713, that the storage period was 4000 hours, and that the volume resistivity measurements were supplemented by measurements of the dielectric constant of the blends using the same impedance spectrometer as previously mentioned. The volume resistivity results are shown in FIG. 3 of the accompanying drawings and the dielectric constant results in FIG. 4.

Figure 3:
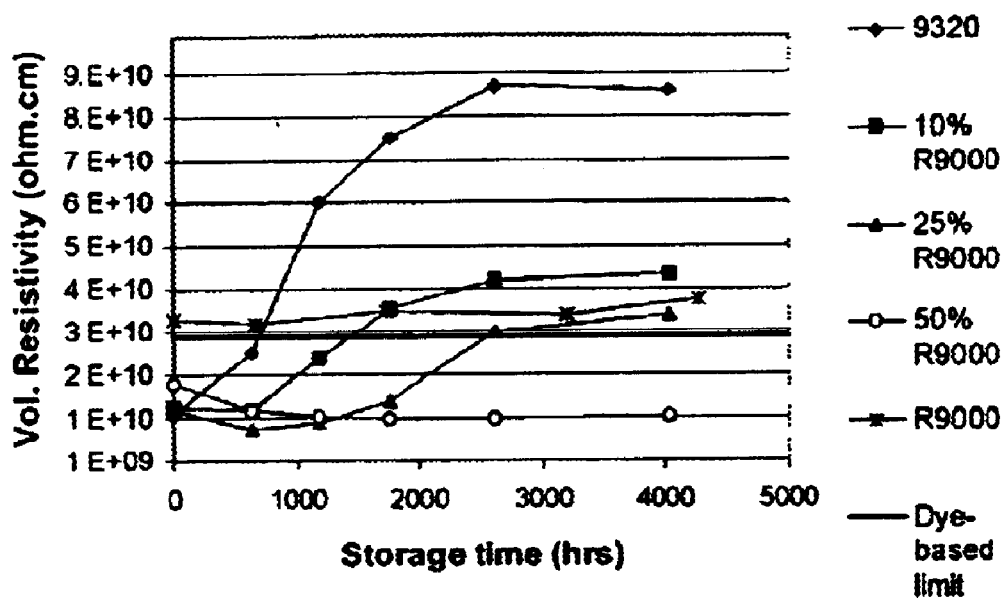
FIG. 3 is a graph illustrating the improved stability on storage of the volume resistivity of a lamination adhesive achieved by blending two commercial materials, as described in Example 2 below.
Figure 4:
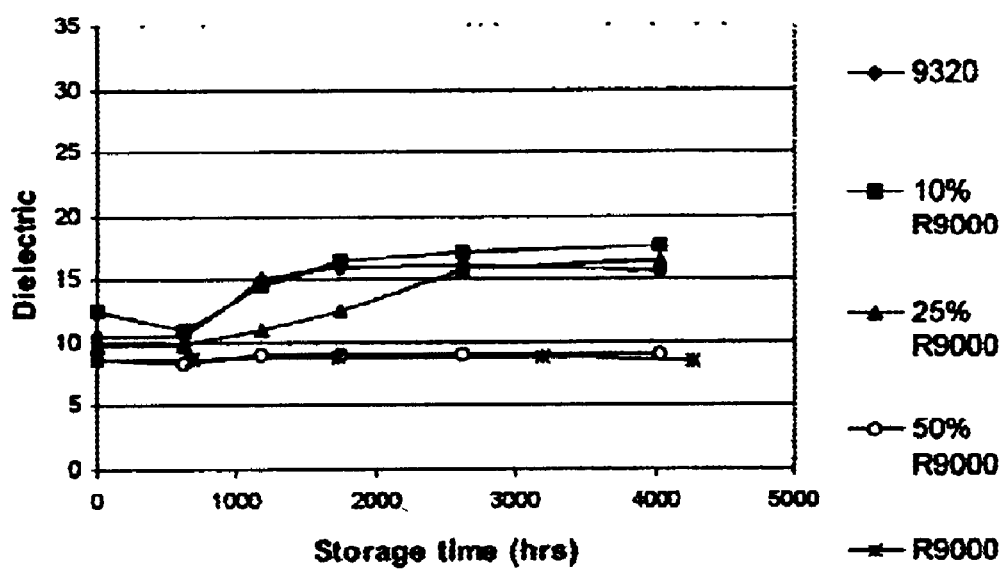
FIG. 4 is a graph illustrating the improved stability on storage of the dielectric constant of lamination adhesives achieved by blending commercial materials, as described in Example 2 below.

From FIG. 3, it will be seen that, although the volume resistivities of both R 9320 and R 9000 underwent substantial changes over the test period, the blends had much more stable resistivities. In particular, the performance of the 50/50 w/w blend was outstanding, displaying a variation by less than a factor of 2 throughout the storage period. FIG. 4 shows that this same 50/50 w/w blend displayed essentially no variation in dielectric constant during the test period.

EXAMPLE 3

This Example illustrates the improved stability of the volume resistivity and dielectric constant of the aforementioned R 9320 upon prolonged storage provided by blending the material with the aforementioned U 53. (U 53 is sold as an adhesive but has been found to give insufficient adhesive strength when used in the type of electrophoretic display used in these experiments.)

Example 2 was repeated, except that the aforementioned U 53 was substituted for the R 9000 and that the storage period was 6000 hours. The volume resistivity results are shown in FIG. 5 of the accompanying drawings and the dielectric constant results in FIG. 6.

Figure 5:
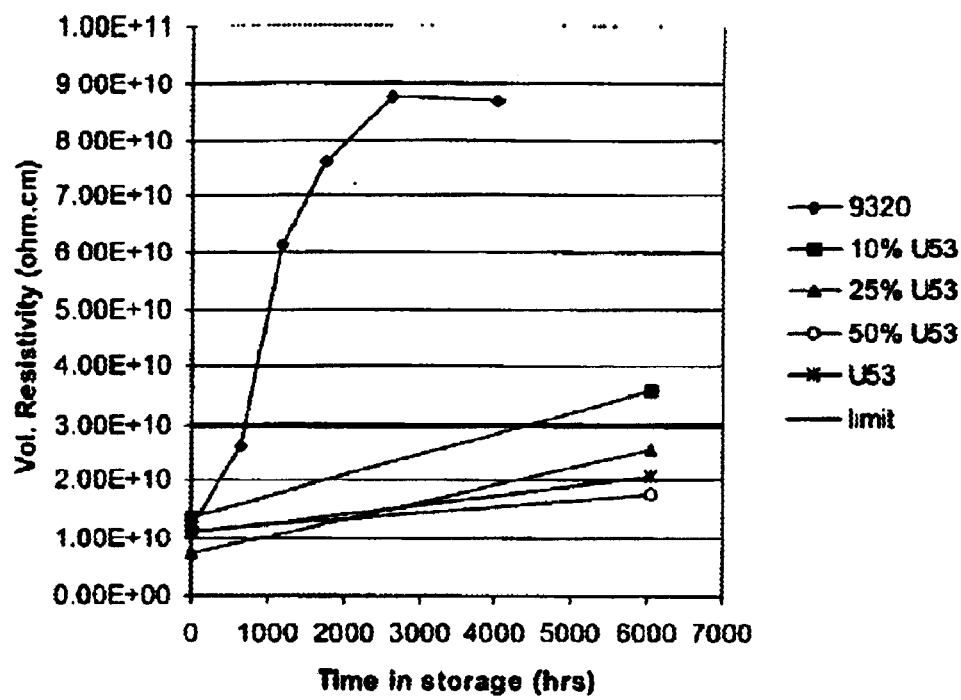
FIG. 5 is a graph illustrating the improved stability on storage of the volume resistivity of lamination adhesives achieved by blending commercial materials, as described in Example 3 below.
Figure 6:
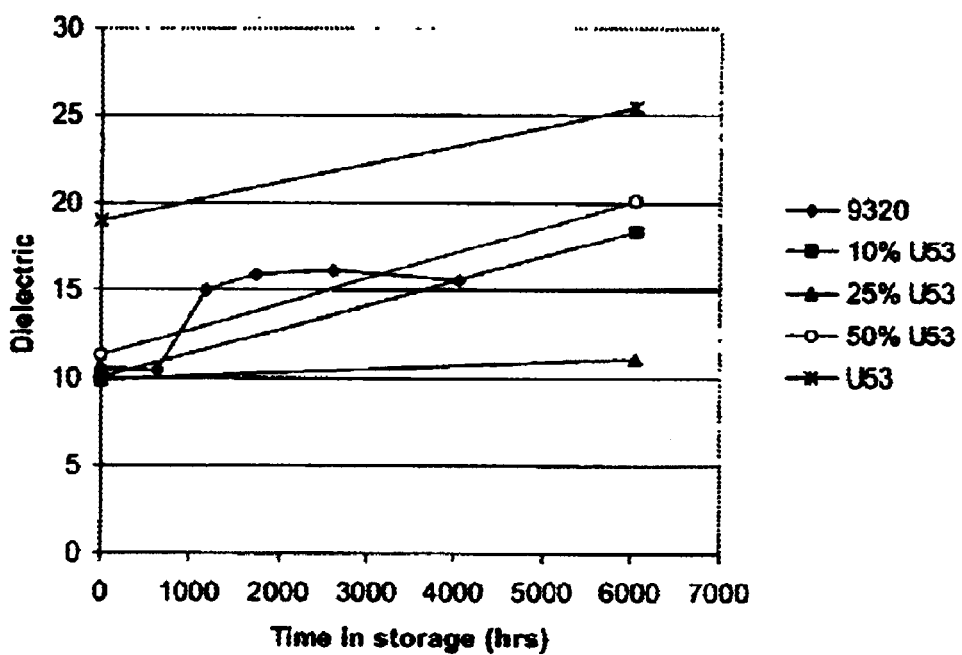
FIG. 6 is a graph illustrating the improved stability on storage of the dielectric constant of lamination adhesives achieved by blending commercial materials, as described in Example 3 below.

From FIG. 5, it will be seen that the substantial changes in the volume resistivities of R 9320 over the test period were much less pronounced in the blends. In particular, the resistivities of the 75/25 and 50/50 w/w blends were within the acceptable range throughout the storage period. Similarly, FIG. 6 shows that both the 75/25 and 50/50 w/w blends displayed acceptable variation in dielectric constant during the test period.

EXAMPLE 4

This Example illustrates the improved stability of the volume resistivity and dielectric constant of the aforementioned R 9320 upon prolonged storage provided by blending the material with the aforementioned U 54. (U 54 is sold as an adhesive but has been found to give insufficient adhesive strength when used in the type of electrophoretic display used in these experiments.)

Example 2 was repeated, except that the aforementioned U 54 was substituted for the R 9000 and that the storage period was 5500 hours. The volume resistivity results are shown in FIG. 7 of the accompanying drawings and the dielectric constant results in FIG. 8.

Figure 7:
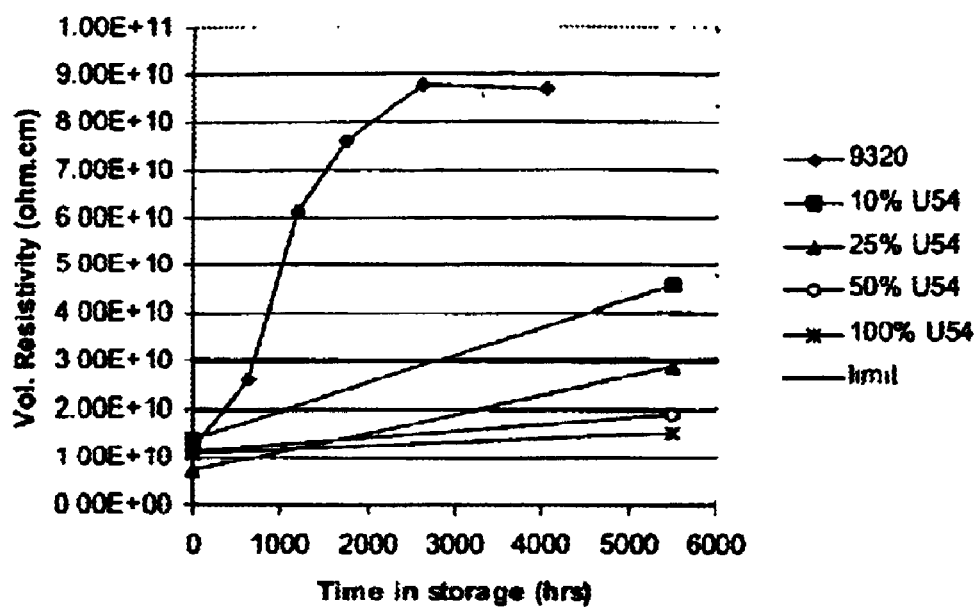
FIGS. 7 and 8 are graphs similar to FIGS. 5 and 6 respectively, but showing the results obtained in Example 4 below.
Figure 8:
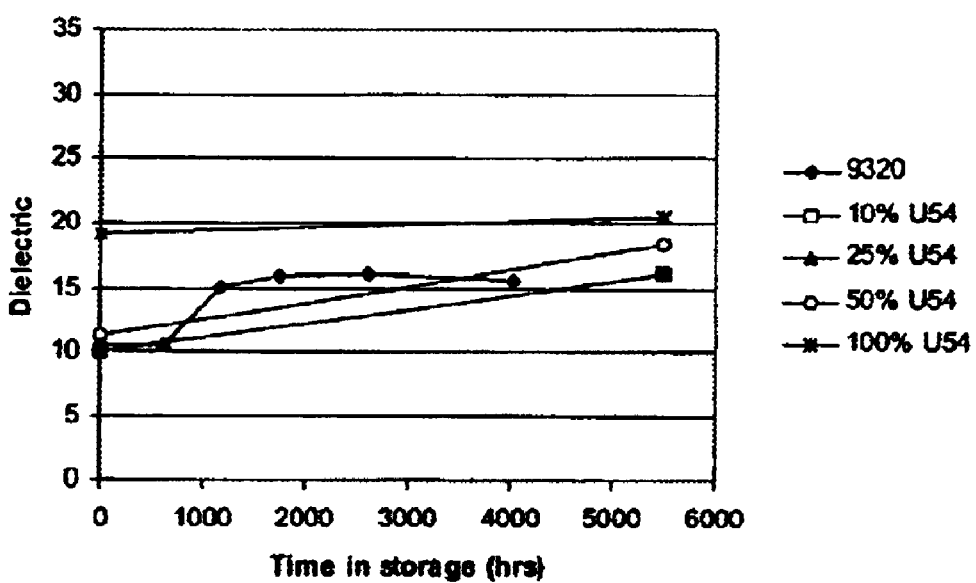

From FIG. 7, it will be seen that the substantial changes in the volume resistivities of R 9320 over the test period were much less pronounced in the blends. In particular, the resistivities of the 75/25 and 50/50 w/w blends were within the acceptable range throughout the storage period. Similarly, FIG. 8 shows that both the 75/25 and 50/50 w/w blends displayed acceptable variation in dielectric constant during the test period.

EXAMPLE 5

This Example illustrates the improved stability of the volume resistivity and dielectric constant of the aforementioned R 9320 upon prolonged storage provided by blending the material with the aforementioned R 9314.

Figure 9:
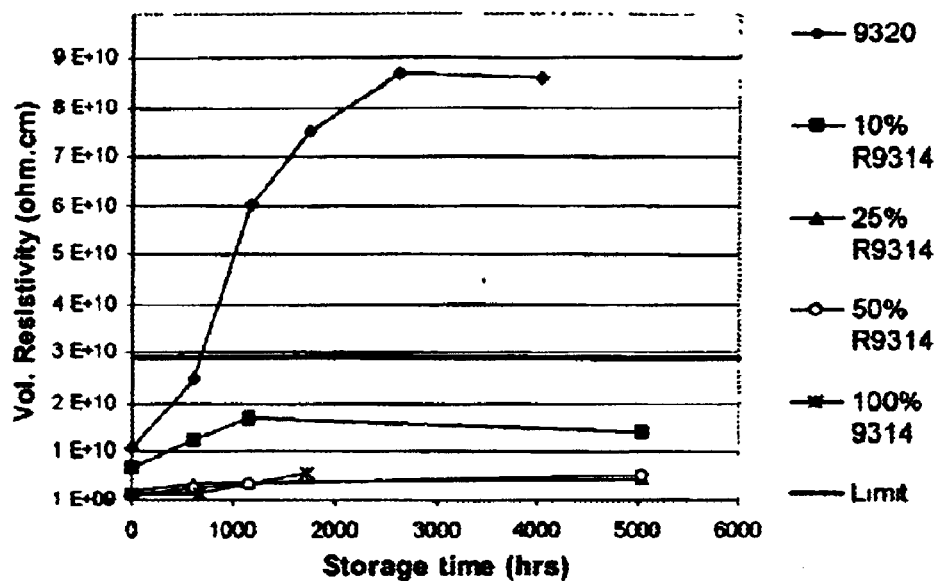
FIGS. 9 and 10 are graphs similar to FIGS. 5 and 6 respectively, but showing the results obtained in Example 5 below.
Figure 10:
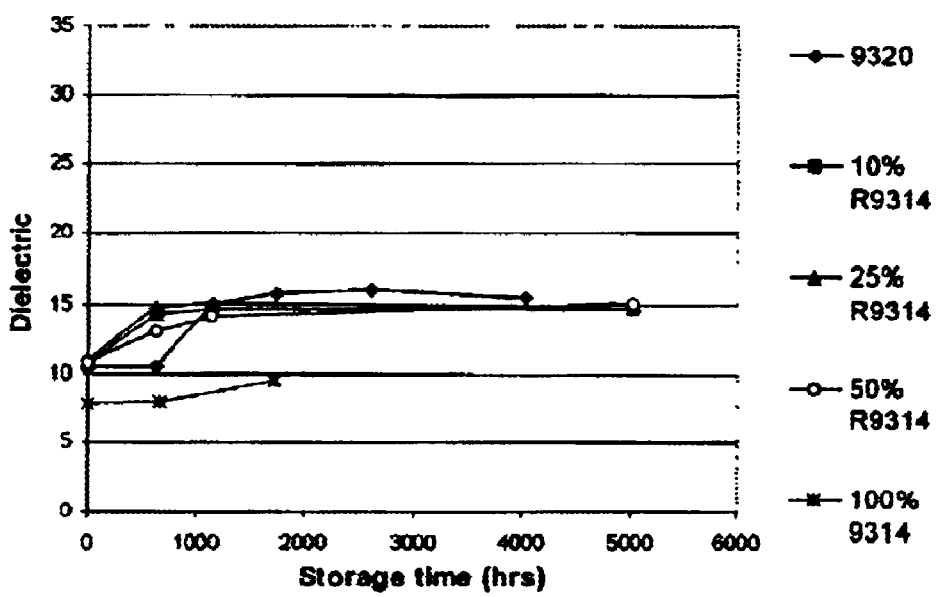

Example 2 was repeated, except that the aforementioned R 9314 was substituted for the R 9000 and that the storage period was 5000 hours. The volume resistivity results are shown in FIG. 9 of the accompanying drawings and the dielectric constant results in FIG. 10.

From FIG. 9, it will be seen that the blends did not suffer from the sharp variations of resistivity with time characteristic of R 9320 (cf. FIGS. 5 and 7), and the resistivities at all times remained below the $3 \times 10^{10}$ ohm cm limit. The dielectric constant data in FIG. 10 also show that all the blends were satisfactory.

EXAMPLE 6

This Example illustrates the effect of a stable resistivity adhesive in improving the performance, and specifically the white state, of an electrophoretic display at low temperatures after prolonged storage.

Figure 11:
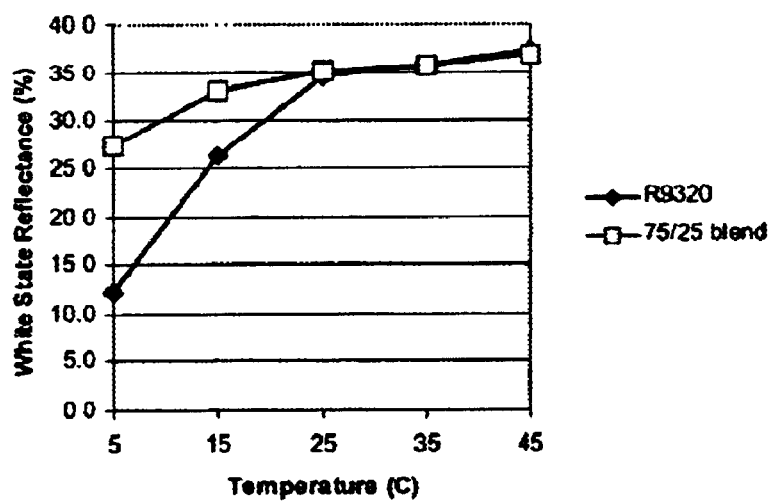
FIG. 11 is a graph showing the improved stability of the white optical state with temperature of an electrophoretic display achieved using a lamination adhesive of the present invention, as described in Example 6 below.

Pure R 9320, and the 75/25 w/w R 9320/U KA 8713 blend mentioned in Example 1 above were used to prepare encapsulated dual particle electrophoretic displays substantially as described in Examples 27–29 of copending application Ser. No. 10/063,803 (the entire disclosure of this copending application is herein incorporated by reference). The resultant displays, which have black and white optical states, were stored at ambient temperature and humidity (indoors) for three months and then tested by first driving the display to its black state, then applying to the electrodes of the display a 15 V, 600 msec electric pulse of a polarity which turned the black state to white, and finally measuring the reflectance of the white state at the end of this pulse. This test was repeated at temperatures from 5 to 45° C., and the results are shown in FIG. 11.

From this Figure, it will be seen that the low temperature decline in reflectivity is much less marked with the blended adhesive than with the pure R 9320. If one reasonably assumes that satisfactory performance for this display requires a minimum white state reflectance of 30%, the R 9320 display had a minimum operating temperature of about 19° C., whereas the display using the blended adhesive had a minimum operating temperature of about 9° C.

Section (ii): Light Resistance and Control

At first glance, it might appear that the effects of light (and other electromagnetic radiation, especially ultra-violet radiation) should not be of major concern in an electro-optic display, since, in the assembled display, the lamination adhesive is sandwiched between the electro-optic medium, which is normally considered opaque, and the backplane, which is also normally opaque. However, it has in fact been found that the effects of light upon the lamination adhesive are an important factor in producing a display with a long working lifetime and stable electro-optic properties during this lifetime. It is believed (although the invention is in no way limited by this belief) that most electro-optic media do in fact transmit some portion of the light falling on the viewing surface through the electro-optic layer to the lamination adhesive, and that this transmitted light can cause changes in the lamination adhesive which adversely affect the working lifetime of the display and/or cause its electro-optic properties to vary with time.

Accordingly, it has been found advantageous for the lamination adhesive to contain an ultra-violet stabilizer, conveniently a hindered amine light stabilizer (HALS) such as those sold commercially under the Registered Trade Mark "TINUVIN". The optimum amount of such a stabilizer can readily be determined empirically, but will typically be in the range of about 0.05 to about 0.5 percent w/w of the lamination adhesive.

Alternatively or in addition, the lamination adhesive may contain a light absorbing material; this light absorbing material may be a dye or a pigment, although the latter is generally preferred, since most dyes will undergo significant bleaching during the long working lifetimes (of the order of 10,000 hours) desired in electro-optic displays. Convenient light absorbing pigments for this purpose are carbon black and magnetite; these materials are inexpensive and typically do not introduce into the display any materials which might adversely affect the properties of the lamination adhesive or the electro-optic medium itself. In addition to stabilizing the lamination adhesive against the effects of light, the light absorbing material may be useful in improving the contrast ratio of the display. As already explained, in most electro-optic displays, some light leaks through the electro-optic medium, and part of this light may be reflected from the backplane back through the electro-optic medium and emerge from the viewing surface of the display. Providing a light absorbing material in the lamination adhesive in accordance with the present invention reduces the amount of such reflected light which re-emerges through the viewing surface, thus slightly reducing the apparent reflectivity of the display. The effect of this decrease in reflectivity is minimal in the white state of the display, but is considerably more significant in the dark state of the display, and thus improves the contrast ratio of the display.

Whether or not an ultra-violet absorber and/or a light absorbing material is used in the lamination adhesive, the adhesive itself should desirably be chosen so as to have minimal susceptibility to degradation by light and other radiation, especially ultra-violet radiation. To this end, it has been found desirable to use an adhesive essentially free from aromatic organic materials, since such materials render the adhesive more susceptible to radiation-induced chemical changes, especially ultra-violet radiation-induced changes. For example, the custom polyurethane described below is formed from aliphatic materials and is free from aromatic groups.

Section (iii): Mechanical Properties

It has been found that, in order to ensure that the lamination adhesive binds the two subassemblies together in a manner which is resistant to the mechanical shocks to which electro-optic displays are often subject, the lamination adhesive should have a peel strength from an electrode material (for example ITO) with which is in contact of at least about 2, and preferably at least about 4, lb/inch. The peel strength from the specific electrode material used is best determined empirically, since it should be noted that the properties of electrode materials such as ITO, fluorine-doped tin oxide and organic semiconductors may vary considerably with the manner in which the layers are deposited so that, for example, the peel strength of any specific lamination adhesive from an ITO-coated polymer film may vary greatly depending upon the exact process used to deposit the ITO. Those skilled in adhesion technology will be aware of a number of standard procedures, such as that prescribed by the American Society for Testing and Materials, which may be used to measure the relevant peel strength.

It has also been found that the thickness of the lamination adhesive needs to be carefully controlled to ensure proper adhesion and a robust display. Too thin a layer of adhesive may fail to produce proper adhesion between the subassemblies and/or may render the display more susceptible to mechanical shock, since to some extent the adhesive may act as a shock absorber between the electro-optic medium and the backplane. Furthermore, as already noted, some types of electro-optic medium, for example encapsulated electrophoretic media, have an inherently non-planar surface, and to ensure proper adhesion and the absence of voids between the subassemblies, the layer of lamination adhesive needs to be thick enough to planarize the surface of the electro-optic medium. Too thick a layer of lamination adhesive introduces unnecessary resistance between the electrodes, thus increasing the operating voltage and power consumption of the display, or increasing the switching time of the display. In addition, an unnecessarily thick layer of lamination adhesive increases the distance between the backplane electrodes and the electro-optic medium, and may thus tend to increase "blooming" or "dot gain" in the display (i.e., it may tend to make the area of the electro-optic medium switched by any given pixel electrode larger than the physical size of that electrode, thus reducing the quality of the image produced by the display). To avoid these problems, the lamination adhesive should have a thickness in the range of about 10 to about 50 $\mu$m; it is preferred that the lamination adhesive have a thickness of from about 10 to about 20 $\mu$m, desirably about 12 to about 18 $\mu$m, and most desirably from about 13 to about 17 $\mu$m. Layers of these preferred thicknesses may be applied by slot coating or other techniques.

The shear modulus of the lamination adhesive is also important. The lamination adhesive should have a relatively low shear modulus at the temperatures to which it is subjected during lamination to enable it to flow over and planarize any projections or recesses in the electro-optic medium. Desirably, the lamination adhesive has a shear modulus at 120° C. of not more than about 1 megaPascal, and preferably not more than about 0.2 megaPascal.

Section (iv): Electrical Properties

As already discussed, electro-optic displays are known to be sensitive to changes in environmental humidity, although the reasons for this sensitivity have not hitherto been well understood. The present inventors have discovered that this sensitivity is largely due to changes in the volume resistivity of lamination adhesives used in prior art electro-optic displays, and that the problems can be greatly reduced or eliminated by paying careful attention to the variation of the volume resistivity with relative humidity. Some lamination adhesives can display changes in volume resistivity of more than two orders of magnitude when the temperature and humidity of their environment is varied within the ranges of 10–50° C. and 10–90 percent relative humidity (RH). For satisfactory performance, it has been found that the volume resistivity of the lamination adhesive should not vary by a factor of more than about 10 within the ranges of 10 to 90 percent RH and 10 to 50° C., or within any broader RH and temperature ranges within which the display is intended to operate. Desirably, the volume resistivity does not change by a factor of more than about 3, and preferably not more than about 2 within the specified RH and temperature ranges. In testing materials for changes in volume resistivity with RH and temperature, the same precautions as discussed above should be observed to ensure that the samples tested are truly in equilibrium with the atmosphere at the desired RH and temperature before the volume resistivities are measured.

It has also been found that there is another, more complex requirement for the electrical properties of the lamination adhesive, namely that the product of the dielectric constant and the volume resistivity of the lamination adhesive should not be greater than the corresponding product for the electro-optic medium within the ranges of 10 to 90 percent RH and 10 to 50° C., or within any broader RH and temperature ranges within which the display is intended to operate. The relative sizes of the two products affect the electric field across the electro-optic medium, and to ensure that this field is satisfactorily large, the aforementioned relationship should be observed.

The two electrical requirements already mentioned are applicable to all types of electro-optic displays. However, it has been found that there are additional electrical requirements for proper operation of encapsulated (and at least some microcell) electrophoretic displays, these additional requirements relating to the relationship between the electrical properties of the lamination adhesive and those of the suspending fluid in which the electrophoretic particles are suspended.

Firstly, the product of the dielectric constant and the volume resistivity of the lamination adhesive should be from about 0.01 to about 100 times the product of the dielectric constant and the volume resistivity of the suspending fluid throughout the operating temperature range of the display (say from about 10 to about 50° C.). Desirably, this ratio should be in the range of from about 0.1 to about 10, and preferably in the range of from about 0.5 to 2. For reasons similar to those discussed above regarding the ratio of the product of the dielectric constant and the volume resistivity of the lamination adhesive to that of the electro-optic medium, the ratio between the same products for the lamination adhesive and the suspending fluid affects the electric field experienced by the electrophoretic particles and hence the switching of the display. Ideally, the two products would be the same at all relevant temperatures, although of course this is essentially impossible to achieve in practice.

Secondly, the ratio of the dielectric constant of the lamination adhesive to the dielectric constant of the suspending fluid within the temperature over the range of from 10 to 50° C. (or the operating temperature range of the display, if wider) should not vary from this ratio at 25° C. by more than about 2 percent, and desirably not by more than about 1 percent. Again, ideally this ratio would not vary at all with temperature.

Thirdly, the ratio of the volume resistivity of the lamination adhesive to the resistivity of the suspending fluid within the temperature range of from 10 to 50° C. (or the operating temperature range of the display, if wider) should not vary from this ratio at 25° C. by more than a factor of about 100, desirably not by a factor of more than about 10, and preferably not by a factor of more than about 2. Again, ideally the ratio would not vary at all with temperature.

The reasons for the second and third requirements given for encapsulated electrophoretic displays are similar to those for the first requirement, as already discussed.

Section (v): Physico-Chemical Properties

The present inventors have also discovered that there are certain important requirements for the physico-chemical properties of lamination adhesives used in electrophoretic displays. The solubility of the suspending fluid in the lamination adhesive should not exceed about 1 percent w/w, desirably not exceed about 0.1 percent w/w and preferably not exceed about 0.01 percent w/w. The solubility of the suspending fluid is in the lamination adhesive can of course readily be measured by standard techniques for measuring the solubility of a liquid in a solid. Thus, as will readily be apparent to physical chemists, the relevant solubility can be measured by forming a dried film of the lamination adhesive, of known weight, using the same processing conditions as are used to form the film of the adhesive in the actual display, soaking this film in a bath of the suspending fluid and measuring the weight gain of the film once the weight of the film becomes stable.

The solubility of the suspending fluid in the lamination adhesive is important because, although the adhesive is in theory separated from the suspending fluid by the capsule (or microcell wall) and the binder (if present), in practice the distance between the suspending fluid and the lamination adhesive is so small that some fluid inevitably finds its way into the adhesive. The presence of an excessive amount of suspending fluid in the adhesive is undesirable, since the fluid tends to change the electrical properties of the adhesive is an unpredictable manner, and may cause the adhesive to swell (thus changing the distance between the electrodes of the display) and may reduce the adhesion between the electrophoretic medium and the adjacent substrate or electrode. Keeping the solubility of the suspending fluid in the lamination adhesive to a minimum helps to reduce these problems to a level where they do not substantially interfere with the proper operation of the display.

A further requirement for the lamination adhesive used in an encapsulated electrophoretic display is that it be substantially free from mobile species which can affect the operation of the display. Electrophoretic displays depend for their operation on the maintenance of stable charges on the electrophoretic particles, and it has been found that these charges may be affected by migration of mobile species from the lamination adhesive into the internal phase containing the electrophoretic particles. Mobile species of concern in this regard include ionic species, especially alkali metal ions such as $Na^+$, surfactants, solvents, primarily organic solvents such as N-methylpyrrolidone (NMP), biocides (which are often present in commercial lamination adhesives to prevent microorganism growth on the lamination adhesive, and are not objectionable in most applications of lamination adhesives) and free monomers. Although the permissible limits of any particular mobile species are best determined empirically, by way of general guidance regarding materials commonly present in commercial lamination adhesives, it has been found desirable to avoid an NMP concentration in excess of about 5 percent w/w, a triethanolamine concentration in excess of about 1 percent w/w and a surfactant concentration greater than about 0.5 percent w/w, based on the weight of the lamination adhesive. It is preferred to eliminate biocides entirely from the lamination adhesive.

No known lamination adhesive possesses properties meeting perfectly all the numerous criteria described above, and hence at present any lamination adhesive necessarily represents a compromise between competing criteria. The specific presently preferred lamination adhesives comprise blends of from 75–25 parts by weight of NeoResin R 9630 with 25–75 parts by weight of either NeoResin R 9330 (an experimental material not yet available in large quantities) or NeoResin R 9314, and the custom polyurethane produced in Example 7 below. In the case of the blends of NeoResin materials, the optimum formulation appears to be 60 parts by weight of R 9630 with 40 parts by weight of R 9330 or R 9314. All the preferred lamination adhesives are aliphatic polyurethanes free from aromatic materials, and have the high light stability characteristic of such aliphatic polyurethanes. No special techniques are required for forming the R9630/R 9330 and R 9630/R 9314 blends; the components are simply mixed in conventional equipment until a substantially homogeneous mixture is obtained. After drying, typically in air at 50° C. for 10 minutes to form a solid layer of the adhesive, all the preferred lamination adhesives are typically laminated using hot rollers at 300° F. (149° C.—note that this refers to the temperature of the rolls, not that of the lamination adhesive itself, which remains substantially lower), at a speed of 0.7 ft/min (3.6 mm/sec) and a pressure of 50 psig (approximately 0.36 mPa). Selected properties of these preferred lamination adhesives are given in the following Table 1:

TABLE 1

| Properties | Preferred Characteristics | 60:40 w/w R 9630/R 9330 | 60:40 w/w R 9630/R 9314 | Custom PU |
|---|---|---|---|---|
| Mechanical | | | | |
| Adhesion | Peel strength >2 lbs/in | 6 | 6 | 4 |
| Bulk modulus | Bulk modulus @ 120° C. $\leq 10^6$ Pascals | $10^6$ | $10^6$ | $6 \times 10^5$ |
| Electrical | | | | |
| Volume resistivity (25° C./22% RH) | $10^8$ to $10^{12}$ ohms-cm | $1 \times 10^{10}$ | $1 \times 10^{10}$ | $2 \times 10^{10}$ |
| Temporal Stability of VR (test of Section (i) above) | <3 | <2 | <2 | <2 |

EXAMPLE 7

This Example illustrates the preparation of the custom polyurethane used as one of the preferred lamination adhesives in the Table above, and also explains the rationale for the design of this custom polyurethane.

There are several processes for waterborne polyurethane preparation, including the acetone process, melt dispersion process, prepolymer mixing process and Ketimine process; see, for example, J. R. Rosthauser et al., Waterborne polyurethane, excerpt from *Advances in Urethane Science and Technology*, K. C. Frisch and D. Klemper, Editors, vol. 10, pp 121–162 (1987). Having regard to the known susceptibility of aromatic polyurethanes to light, and the need for hydrolytic stability (since hydrolysis of the polyurethane may cause changes in the volume resistivity), it was decided that a promising approach was polyurethanes based upon polyalkylene oxides and aliphatic diisocyanates.

Figure 12:
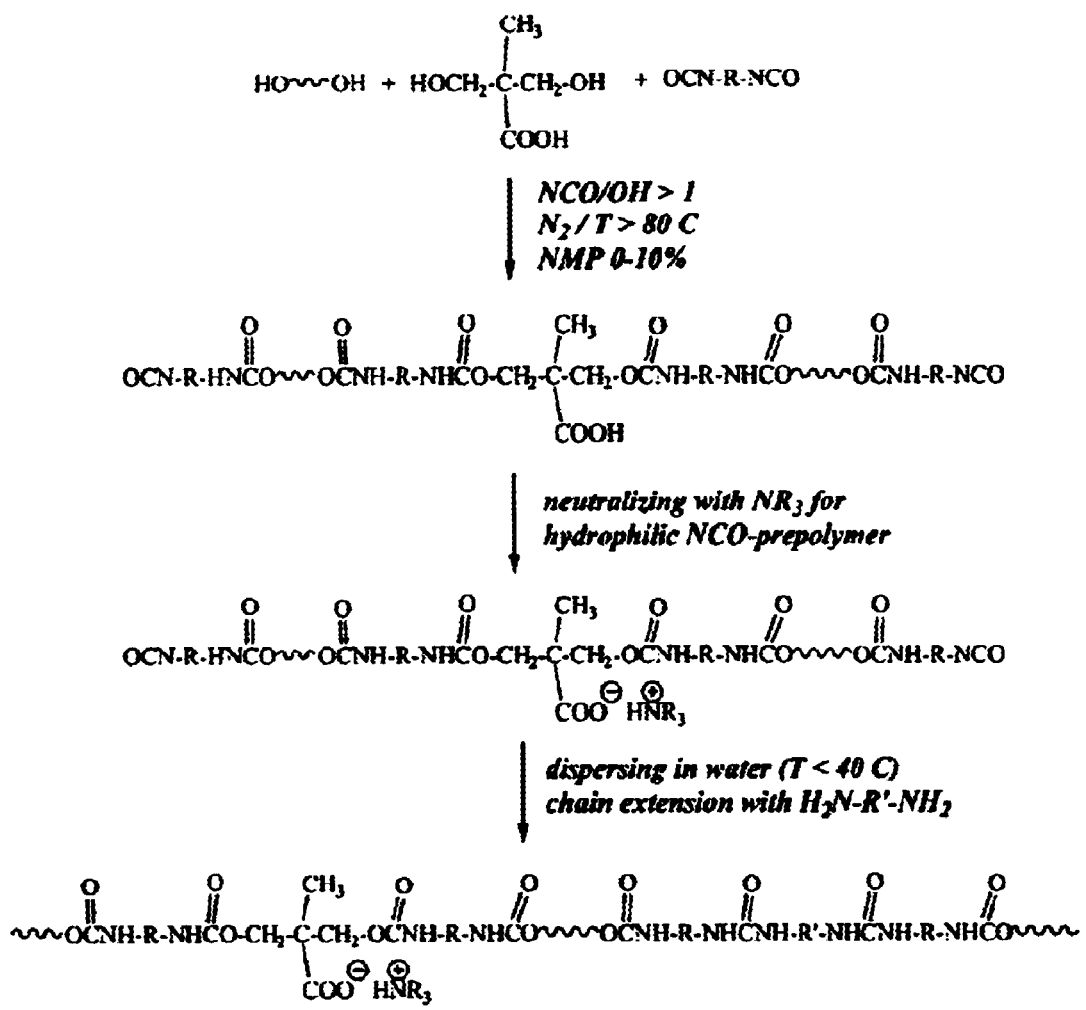
FIG. 12 illustrates the synthetic scheme used in Example 7 below to produce certain polyurethanes preferred for use in the present invention.
Figure 13:
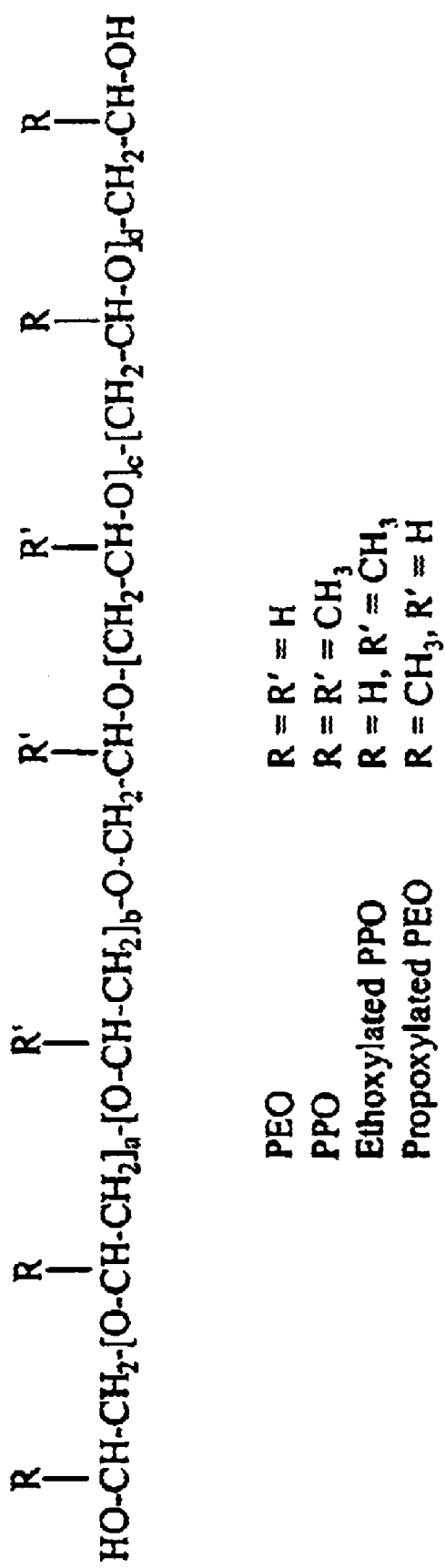
FIG. 13 illustrates the chemical structure of certain materials used in Example 7 below.

FIG. 12 of the accompanying drawings shows schematically the prepolymer synthetic route used to produce the custom polyurethane, utilizing a polyamine in the chain extension step and a small amount of solvent. In a first series of experiments, the polyalkylene oxide used was polypropylene oxide (PPO) in the form of the VORANOL (Registered Trade Mark) series from Dow Chemical Company, Wilmington Del.; the softness and flexibility provided by a PPO backbone is well suited for a lamination adhesive. The molecular weight of the PPO segment varied from 1000 to 4000. The structures of the materials used are shown in FIG. 13.

The diisocyanate used was 4,4'-methylene bis(cyclohexyl isocyanate), usually known as "$H_{12}MDI$", available from Bayer under the Registered Trade Mark DESMODUR W. This material was selected for its excellent light stability and moisture resistance for polyurethane applications.

Other materials used in these experiments were as follows:

NMP (1-methyl-2-pyrrolidone, available from Aldrich Chemical Company) as co-solvent;

DMPA (2,2-bis(hydroxymethyl) propionic acid, also available from Aldrich Chemical Company), as an internal anionic stabilizing segment;

$SnBu_2L_2$ (dibutyl tin dilaurate, also available from Aldrich Chemical Company) as catalyst;

TEA (triethylamine, also available from Aldrich Chemical Company), as a neutralizing agent; and HDA (hexamethylenediamine, also available from Aldrich Chemical Company), as a chain extender.

The apparatus used for preparing the polyurethanes comprised a 500 ml jacketed three-necked glass reactor provided with a circulated water cooling/heating bath, an overhead mechanical mixer with a 45° angled paddle, and a nitrogen inlet. The detailed synthetic procedure was as follows:

Prepolymer step: The reactor jacket was heated to 90° C., then pre-weighed DMPA, NMP, PPO diol and $SnBu_2L_2$ were added. An inert atmosphere was maintained during the reaction using the nitrogen inlet. The reactants were stirred at 250 rpm with the overhead mixer for 15 minutes, and DMPA was dissolved gradually during the mixing. $H_{12}MDI$ was then added dropwise over a period of 5 minutes and polyaddition polymerization was allowed to proceed for 3 hours at 90° C.

Dispersing step: The reactor was the cooled to 70° C. and TEA was added over a period of approximately 5 minutes, then the reactants were stirred for 20 minutes. The reactor was cooled to 35° C. and it was observed that polymer viscosity increased sharply. The stirring speed was increased to 750 rpm to disperse the prepolymer into water, which was added dropwise over a period of approximately 15 minutes, and the resultant mixture was dispersed for an additional 30 minutes at 750 rpm.

Chain extension step: HDA was added dropwise over a period of approximately 5 minutes and the resultant mixture stirred for an hour. The reactor temperature was then increased to 70° C. for one hour to react all the residual diisocyanate. The reactor was then cooled to 25° C., the nitrogen inlet was shut off, and the product was collected for analysis.

The specific custom polyurethane mentioned in Table 1 above was prepared using this procedure with the following materials:

PPO2000 (Dow Voranol 220-056), CAS#25322-69-4

NMP (1-methyl-2-pyrrolidone, Aldrich), CAS#872-50-4

DMPA (2,2-bis(hydroxymethyl) propionic acid, Aldrich), CAS#4767-03-7

$SnBu_2L_2$ (dibutyl tin dilaurate, Aldrich), CAS#77-58-7

$H_{12}MDI$ (4,4'-methylene bis(cyclohexyl isocyanate), Bayer Desmodur W), CAS#5124-30-1

TEA (triethyl amine, Aldrich), CAS#121-44-8

The relative proportions of the materials are given in FIG. 14.

The polymer backbone in this polyurethane consisted of PPO-DMPA-$H_{12}MDI$, 100 percent neutralized with TEA, followed by chain extension with HDA. The DMPA/PPO2000 molar ratio was kept at 1:1 and the NCO/OH ratio was 1.4:1.

Five separate batches of the material were prepared and the weight average molecular weight and volume resistivities of the materials are shown in Table 2 below; Batch 4 was used as the custom polyurethane in Table 1 above.

TABLE 2

| Batch No. | $M_w$ | VR (ohm-cm) 22° C./25% RH |
|---|---|---|
| 1 | 36430 | 8.0e9 |
| 2 | 42896 | 4.0e10 |
| 3 | 53256 | 7.0e10 |
| 4 | Not Available | 2.0e10 |
| 5 | 52861 | 7.0e10 |

These data indicate a correlation between molecular weight and volume resistivity, which may be explained by an ionic conduction mechanism.

A second custom polyurethane was prepared in a similar manner and using the same materials, except that water was used for chain extension instead of HDA. A detailed description of the materials used is given in FIG. 15.

\* \* \* \* \* \* \* \* \* \* \* \* \*

The electro-optic medium present in the displays of the present invention may be of any of the types previously discussed. Thus, the electro-optic medium may be a rotating bichromal member, an electrochromic medium or a micro-cell electrophoretic medium. However, it is preferred that the electro-optic medium be an electrophoretic medium comprising a plurality of capsules, each capsule comprising a capsule wall and an internal phase comprising electrically charged particles suspended in a suspending fluid and capable of moving through the fluid on application of an electric field to the electrophoretic medium. Desirably, in addition to the capsules, the electrophoretic medium comprises a polymeric binder within which the capsules are held.

Also, as already indicated, the display may be of any of the forms described in the aforementioned patents and applications. Thus, typically the display will comprise at least one electrode disposed between the electro-optic medium and one of the substrates, this electrode being arranged to apply an electric field to the electro-optic medium. Generally, the display will comprise two electrodes disposed on opposed sides of the electro-optic medium and between the electro-optic medium and the two substrates, at least one of the electrodes and the adjacent substrate being light-transmissive such that the electro-optic medium can be viewed through the light-transmissive substrate and electrode.

Apart from the inclusion of the adhesive composition of the present invention, the electrophoretic media and displays of the present invention may employ the same components and manufacturing techniques as in the aforementioned patents and applications. The following Sections A–E describe useful materials for use in the various components of the encapsulated electrophoretic displays of the present invention.

A. Electrophoretic Particles

There is much flexibility in the choice of particles for use in electrophoretic displays, as described above. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Zinc sulfide electroluminescent particles may be encapsulated with an insulative coating to reduce electrical conduction. Finally, the particles may be surface treated so as to improve charging or interaction with a charging agent, or to improve dispersability.

One particle for use in electrophoretic displays of the invention is titania. The titania particles may be coated with a metal oxide, such as aluminum oxide or silicon oxide, for example. The titania particles may have one, two, or more layers of metal-oxide coating. For example, a titania particle for use in electrophoretic displays of the invention may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, Hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del., hereinafter abbreviated "du Pont"), Crocein Scarlet N Ex (du Pont) (27290), Fiber Black VF (du Pont) (30235), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Black 4); Sulphone Cyanine Black BA-CF (GAF)

(26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 $\mu$m), Statex B-12 (Columbian Carbon Co.) (a furnace black of 33 $\mu$m average particle size), and chrome green.

Particles may also include laked, or dyed, pigments. Laked pigments are particles that have a dye precipitated on them or which are stained. Lakes are metal salts of readily soluble anionic dyes. These are dyes of azo, triphenyl-methane or anthraquinone structure containing one or more sulphonic or carboxylic acid groupings. They are usually precipitated by a calcium, barium or aluminum salt onto a substrate. Typical examples are peacock blue lake (Cl Pigment Blue 24) and Persian orange (lake of Cl Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 $\mu$m, as long as the particles are smaller than the bounding capsule. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

Useful polymers for the particles include, but are not limited to: polystyrene, polyethylene, polypropylene, phenolic resins, du Pont Elvax resins (ethylene-vinyl acetate copolymers), polyesters, polyacrylates, polymethacrylates, ethylene acrylic acid or methacrylic acid copolymers (Nucrel Resins du Pont, Primacor Resins Dow Chemical), acrylic copolymers and terpolymers (Elvacite Resins du Pont) and PMMA. Useful materials for homopolymer/pigment phase separation in high shear melt include, but are not limited to, polyethylene, polypropylene, poly(methyl methacrylate), poly(isobutyl methacrylate), polystyrene, polybutadiene, polyisoprene, polyisobutylene, poly(lauryl methacrylate), poly(stearyl methacrylate), poly(isobornyl methacrylate), poly(t-butyl methacrylate), poly(ethyl methacrylate), poly(methyl acrylate), poly(ethyl acrylate), polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. For example, the processes and materials for both the fabrication of liquid toner particles and the charging of those particles may be relevant.

New and useful electrophoretic particles may still be discovered, but a number of particles already known to those skilled in the art of electrophoretic displays and liquid toners can also prove useful. In general, the polymer requirements for liquid toners and encapsulated electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by encapsulated electrophoretic inks is that the toner must be capable of "fixing" the image, i.e., heat fusing together to create a uniform film after the deposition of the toner particles.

Typical manufacturing techniques for particles may be drawn from the liquid toner and other arts and include ball milling, attrition, jet milling, etc. The process will be illustrated for the case of a pigmented polymeric particle. In such a case the pigment is compounded in the polymer, usually in some kind of high shear mechanism such as a screw extruder. The composite material is then (wet or dry) ground to a starting size of around 10 $\mu$m. It is then dispersed in a carrier liquid, for example ISOPAR® (Exxon, Houston, Tex.), optionally with some charge control agent(s), and milled under high shear for several hours down to a final particle size and/or size distribution.

Another manufacturing technique for particles is to add the polymer, pigment, and suspending fluid to a media mill. The mill is started and simultaneously heated to a temperature at which the polymer swells substantially with the solvent. This temperature is typically near 100° C. In this state, the pigment is easily encapsulated into the swollen polymer. After a suitable time, typically a few hours, the mill is gradually cooled back to ambient temperature while stirring. The milling may be continued for some time to achieve a small enough particle size, typically a few microns in diameter. The charging agents may be added at this time. Optionally, more suspending fluid may be added.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric latices, for example with metal oxides or dyes.

B. Suspending Fluid

The suspending fluid containing the particles can be chosen based on properties such as density, refractive index, and solubility. A preferred suspending fluid has a low dielectric constant (about 2), high volume resistivity (about $10^{15}$ ohm cm), low viscosity (less than 5 centistokes ("cst")), low toxicity and environmental impact, low water solubility (less than 10 parts per million ("ppm")), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and bounding capsule. The viscosity of the fluid should be low when movement of the particles is desired. The refractive index of the suspending fluid may also be substantially matched to that of the particles. As used herein, the refractive index of a suspending fluid is substantially matched to that of a particle if the difference between their respective refractive indices is between about zero and about 0.3, and is preferably between about 0.05 and about 0.2.

Additionally, the fluid may be chosen to be a poor solvent for some polymers, which is advantageous for use in the fabrication of microparticles, because it the range of polymeric materials useful in fabricating particles of polymers and pigments. Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding capsule. Reactants or solvents for the microencapsulation process (oil soluble monomers, for example) can also be contained in the suspending fluid. Charge control agents can also be added to the suspending fluid.

Useful organic solvents include, but are not limited to, epoxides, such as decane epoxide and dodecane epoxide; vinyl ethers, such as cyclohexyl vinyl ether and Decave® (International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the Isopar® series (Exxon, Houston, Tex.), Norpar® (a series of normal paraffinic liquids), Shell-Sol® (Shell, Houston, Tex.), and Sol-Trol® (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), Galden® (a perfluorinated ether from Ausimont, Morristown, N.J.), or Krytox® from du Pont (Wilmington, Del.). In a preferred embodiment, the suspending fluid is a poly(chlorotrifluoroethylene) polymer. In a particularly preferred embodiment, this polymer has a degree of polymerization from about 2 to about 10. Many of the above materials are available in a range of viscosities, densities, and boiling points.

The fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. One surfactant for use in displays of the invention is sodium dodecylsulfate.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

There are many dyes that can be used in encapsulated electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

C. Charge Control Agents and Particle Stabilizers

Charge control agents are used to provide good electrophoretic mobility to the electrophoretic particles. Stabilizers are used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. The charging properties of the pigment itself may be accounted for by taking into account the acidic or basic surface properties of the pigment, or the charging sites may take place on the carrier resin surface (if present), or a combination of the two. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyidecyne-4,7-diol, poly(propylene glycol), pentaethylene glycol, tripropylene glycol, triethylene glycol, glycerol, pentaerythritol, glycerol tris(12-hydroxystearate), propylene glycerol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis (2-hydroxyethyl)ethylenediamine. The charge adjuvant is preferably present in the suspending fluid in an amount of about 1 to about 100 milligrams per gram ("mg/g") of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Corning® Z-6070, Z-6124, and 3 additive, Midland, Mich.); organic titanates and zirconates (Tyzor® TOT, TBT, and TE Series, du Pont); hydrophobing agents, such as long chain ($C_{12}$ to $C_{50}$) alkyl and alkyl benzene sulphonic acids, fatty amines or diamines and their salts or quaternary derivatives; and amphipathic polymers which can be covalently bonded to the particle surface.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl) sodium sulfosuccinate, calcium dodecylbenzenesulfonate, calcium petroleum sulfonate, neutral or basic barium dinonyinaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, Co—, Ca—, Cu—, Mn—, Ni—, Zn—, and Fe-salts of naphthenic acid, Ba—, Al—, Zn—, Cu—, Pb—, and Fe-salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, zinc naphthenate, Mn— and Zn— heptanoate, and Ba—, Al—, Co—, Mn—, and Zn— octanoate. Useful block or comb copolymers include, but are not limited to, AB diblock copolymers of (A) polymers of 2-(N,N-dimethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides include, but are not limited to, polyisobutylene succinimides such as OLOA 1200 and 3700, and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

D. Encapsulation

Encapsulation of the internal phase may be accomplished in a number of different ways. Numerous suitable procedures for microencapsulation are detailed in both *Microencapsulation, Processes and Applications,* (I. E. Vandegaer, ed.), Plenum Press, New York, N.Y. (1974) and Gutcho, *Microcapsules and Microencapsulation Techniques,* Noyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes to form the capsule include, but are not limited to, gelatin, poly(vinyl alcohol), poly(vinyl acetate), and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, poly (methyl methacrylate) (PMMA), poly(ethyl methacrylate), poly(butyl methacrylate), ethyl cellulose, poly (vinylpyridine), and polyacrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, methyl methacrylate (MMA) and acrylonitrile. Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic fluid (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one in situ polymerization process, urea and formaldehyde condense in the presence of poly(acrylic acid) (see, e.g., U.S. Pat. No. 4,001,140). In other processes, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and polyisocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Coating aids can be used to improve the uniformity and quality of the coated or printed electrophoretic ink material. Wetting agents are typically added to adjust the interfacial tension at the coating/substrate interface and to adjust the liquid/air surface tension. Wetting agents include, but are not limited to, anionic and cationic surfactants, and nonionic species, such as silicone or fluoropolymer-based materials. Dispersing agents may be used to modify the interfacial tension between the capsules and binder, providing control over flocculation and particle settling.

Surface tension modifiers can be added to adjust the air/microcapsule interfacial tension. Polysiloxanes are typically used in such an application to improve surface leveling while minimizing other defects within the coating. Surface tension modifiers include, but are not limited to, fluorinated surfactants, such as, for example, the Zonyl® series from du Pont, the Fluorad® series from 3M (St. Paul, Minn.), and the fluoroalkyl series from Autochem (Glen Rock, N.J.); siloxanes, such as, for example, Silwet® from Union Carbide (Danbury, Conn.); and polyethoxy and polypropoxy alcohols. Antifoams, such as silicone and silicone-free polymeric materials, may be added to enhance the movement of air from within the microcapsule layer to the surface and to facilitate the rupture of bubbles at the coating surface. Other useful antifoams include, but are not limited to, glyceryl esters, polyhydric alcohols, compounded antifoams, such as oil solutions of alkylbenzenes, natural fats, fatty acids, and metallic soaps, and silicone antifoaming agents made from the combination of dimethyl siloxane polymers and silica. Stabilizers such as UV-absorbers and antioxidants may also be added to improve the lifetime of the ink.

E. Binder Material

The binder typically is used as an adhesive medium that supports and protects the capsules, as well as binds the electrode materials to the capsule dispersion. A binder can be non-conducting, semiconductive, or conductive. Binders are available in many forms and chemical types. Among these are water-soluble polymers, water-borne polymers, oil-soluble polymers, thermoset and thermoplastic polymers, and radiation-cured polymers.

Among the water-soluble polymers are the various polysaccharides, the polyvinyl alcohols, N-methylpyrrolidone, N-vinylpyrrolidone, the various Carbowax® species (Union Carbide, Danbury, Conn.), and poly(2-hydroxyethyl acrylate).

The water-dispersed or water-borne systems are generally latex compositions, typified by the Neorez® and Neocryl® resins (Zeneca Resins, Wilmington, Mass.), Acrysol® (Rohm and Haas, Philadelphia, Pa.), Bayhydrol® (Bayer, Pittsburgh, Pa.), and the Cytec Industries (West Paterson, N.J.) HP line. These are generally latices of polyurethanes, occasionally compounded with one or more of the acrylics, polyesters, polycarbonates or silicones, each lending the final cured resin in a specific set of properties defined by glass transition temperature, degree of "tack", softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a cross-linking reagent, such as an aziridine, for example, which reacts with carboxyl groups.

A typical application of a water-borne resin and aqueous capsules follows. A volume of particles is centrifuged at low speed to separate excess water. After a given centrifugation process, for example 10 minutes at 60×gravity ("g"), the capsules 180 are found at the bottom of the centrifuge tube 182, while the water portion 184 is at the top. The water portion is carefully removed (by decanting or pipetting). The mass of the remaining capsules is measured, and a mass of resin is added such that the mass of resin is, for example, between one eighth and one tenth of the weight of the capsules. This mixture is gently mixed on an oscillating mixer for approximately one half hour. After about one half hour, the mixture is ready to be coated onto the appropriate substrate.

The thermoset systems are exemplified by the family of epoxies. These binary systems can vary greatly in viscosity, and the reactivity of the pair determines the "pot life" of the mixture. If the pot life is long enough to allow a coating operation, capsules may be coated in an ordered arrangement in a coating process prior to the resin curing and hardening.

Thermoplastic polymers, which are often polyesters, are molten at high temperatures. A typical application of this type of product is hot-melt glue. A dispersion of heat-resistant capsules could be coated in such a medium. The solidification process begins during cooling, and the final hardness, clarity and flexibility are affected by the branching and molecular weight of the polymer.

Oil or solvent-soluble polymers are often similar in composition to the water-borne system, with the obvious exception of the water itself. The latitude in formulation for solvent systems is enormous, limited only by solvent choices and polymer solubility. Of considerable concern in solvent-based systems is the viability the capsule itself; the integrity of the capsule wall cannot be compromised in any way by the solvent.

Radiation cure resins are generally found among the solvent-based systems. Capsules may be dispersed in such a medium and coated, and the resin may then be cured by a timed exposure to a threshold level of ultraviolet radiation, either long or short wavelength. As in all cases of curing polymer resins, final properties are determined by the branching and molecular weights of the monomers, oligomers and cross-linkers.

A number of "water-reducible" monomers and oligomers are, however, marketed. In the strictest sense, they are not water soluble, but water is an acceptable diluent at low concentrations and can be dispersed relatively easily in the mixture. Under these circumstances, water is used to reduce the viscosity (initially from thousands to hundreds of thousands centipoise). Water-based capsules, such as those made from a protein or polysaccharide material, for example, could be dispersed in such a medium and coated, provided the viscosity could be sufficiently lowered. Curing in such systems is generally by ultraviolet radiation.

Like other encapsulated electrophoretic displays, the encapsulated electrophoretic displays of the present invention provide flexible, reflective displays that can be manufactured easily and consume little power (or no power in the case of bistable displays in certain states). Such displays, therefore, can be incorporated into a variety of applications and can take on many forms. Once the electric field is removed, the electrophoretic particles can be generally stable. Additionally, providing a subsequent electric charge can alter a prior configuration of particles. Such displays may include, for example, a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. Alternatively or in addition, the particles may have a refractive index that substantially matches the refractive index of the suspending fluid.

An encapsulated electrophoretic display may take many forms. The capsules of such a display may be of any size or shape. The capsules may, for example, be spherical and may have diameters in the millimeter range or the micron range, but are preferably from about ten to about a few hundred microns. The particles within the capsules of such a display may be colored, luminescent, light-absorbing or transparent, for example.

It will be apparent to those skilled in the art that numerous changes can be made in the specific embodiments of the present invention already described without departing from the spirit scope of the invention. Accordingly, the whole of the foregoing description is to be construed in an illustrative and not in a limitative sense.

From the foregoing, it will be seen that the present invention provides electro-optic displays with improved lamination adhesives. The present invention requires only conventional apparatus and processing techniques which are familiar to those skilled in the manufacture of electro-optic displays.

What is claimed is:

1. An electro-optic display comprising first and second substrates and a lamination adhesive layer and a layer of a solid electro-optic material disposed between the first and second substrates, the lamination adhesive layer having a volume resistivity, measured at 10° C., which does not change by a factor of more than about 3 after being held at 25° C. and 45 percent relative humidity for 1000 hours.

2. An electro-optic display according to claim 1 wherein the volume resistivity of the lamination adhesive measured at 10° C. does not change by a factor of more than about 2 after being held at 25° C. and 45 percent relative humidity for 1000 hours.

3. An electro-optic display according to claim 2 wherein the volume resistivity of the lamination adhesive measured at 10° C. does not change by a factor of more than about 1.5 after being held at 25° C. and 45 percent relative humidity for 1000 hours.

4. An electro-optic display according to claim 1 wherein the lamination adhesive layer is essentially free from plasticizer.

5. An electro-optic display according to claim 1 wherein the lamination adhesive layer exhibits a change in the enthalpy associated with any phase transition in the material, as measured by differential scanning calorimetry, that is not more than about 2 Joules per gram after being held at 25° C. and 45 percent relative humidity for 1000 hours.

6. An electro-optic display according to claim 1 wherein the lamination adhesive layer exhibits a change in dielectric constant of less than about 2 after being held at 25° C. and 45 percent relative humidity for 1000 hours.

7. An electro-optic display according to claim 1 wherein the lamination adhesive comprises a blend of at least two materials.

8. An electro-optic display according to claim 1 wherein the lamination adhesive comprises a blend of at least two lamination adhesives, at least one of which has a volume resistivity, measured at 10° C., which changes by a factor of more than 3 after being held at 25° C. and 45 percent relative humidity for 1000 hours.

9. An electro-optic display according to claim 1 wherein the lamination adhesive comprises at least one polyurethane.

10. An electro-optic display according to claim 9 wherein the lamination adhesive comprises a blend of at least two polyurethanes.

11. An electro-optic display according to claim 10 wherein the lamination adhesive comprises a blend of a non-ionically stabilized polyester-based polyurethane and an anionically stabilized polyester-based polyurethane.

12. An electro-optic display according to claim 1 wherein the lamination adhesive has a volume resistivity, measured at 10° C., of not more than about $3\times10^{10}$ ohm cm.

13. An electro-optic display according to claim 1 wherein the electro-optic medium comprises a rotating bichromal member, electrochromic, encapsulated liquid crystal or microcell electrophoretic medium.

14. An electro-optic display according to claim 1 wherein the electro-optic medium comprises an electrophoretic medium comprising a plurality of capsules, each capsule comprising a capsule wall and an internal phase encapsulated within capsule wall, the internal phase comprising electrically charged particles suspended in a suspending fluid and capable of moving through the fluid on application of an electric field to the electrophoretic material.

15. An electro-optic display according to claim 14 further comprising a polymeric binder within which the capsules are held.

16. An electro-optic display according to claim 14 further comprising at least one electrode disposed between the electro-optic medium and one of the substrates, this electrode being arranged to apply an electric field to the electro-optic medium.

17. An electro-optic display according to claim 16 comprising two electrodes disposed on opposed sides of the electro-optic medium and between the electro-optic medium and the two substrates, at least one of the electrodes and the adjacent substrate being light-transmissive such that the electro-optic medium can be viewed through the light-transmissive substrate and electrode.

18. A process for preparing an electro-optic display by providing a first subassembly comprising an electro-optic layer and a first substrate, providing a second subassembly comprising a second substrate, at least one of said subassemblies comprising an electrode, and laminating the two subassemblies to one another using a lamination adhesive so that the electro-optic layer is disposed between the first and second substrates, the lamination adhesive having a volume resistivity, measured at 10° C., which does not change by a factor of more than about 3 after being held at 25° C. and 45 percent relative humidity for 1000 hours.

19. A process according to claim 18 wherein the volume resistivity of the lamination adhesive measured at 10° C. does not change by a factor of more than about 2 after being held at 25° C. and 45 percent relative humidity for 1000 hours.

20. A process according to claim 19 wherein the volume resistivity of the lamination adhesive measured at 10° C. does not change by a factor of more than about 1.5 after being held at 25° C. and 45 percent relative humidity for 1000 hours.

21. A process according to claim 18 wherein the lamination adhesive layer is essentially free from plasticizer.

22. A process according to claim 18 wherein the lamination adhesive layer exhibits a change in the enthalpy associated with any phase transition in the material, as measured by differential scanning calorimetry, that is not more than about 2 Joules per gram after being held at 25° C. and 45 percent relative humidity for 1000 hours.

23. A process according to claim 18 wherein the lamination adhesive layer exhibits a change in dielectric constant of less than about 2 after being held at 25° C. and 45 percent relative humidity for 1000 hours.

24. A process according to claim 18 wherein the lamination adhesive comprises a blend of at least two materials.

25. A process according to claim 18 wherein the lamination adhesive comprises a blend of at least two lamination adhesives at least one of which has a volume resistivity, measured at 10° C., which changes by a factor of more than 3 after being held at 25° C. and 45 percent relative humidity for 1000 hours.

26. A process according to claim 18 wherein the lamination adhesive comprises at least one polyurethane.

27. A process according to claim 26 wherein the lamination adhesive comprises a blend of at least two polyurethanes.

28. A process according to claim 27 wherein the lamination adhesive comprises a blend of a non-ionically stabilized polyester-based polyurethane and an anionically stabilized polyester-based polyurethane.

29. A process according to claim 18 wherein the lamination adhesive has a volume resistivity, measured at 10° C., of not more than about $3\times10^{10}$ ohm cm.

30. A process according to claim 18 wherein the electro-optic medium comprises a rotating bichromal member, electrochromic, encapsulated liquid crystal or microcell electrophoretic medium.

31. A process according to claim 18 wherein the electro-optic medium comprises an electrophoretic medium comprising a plurality of capsules, each capsule comprising a capsule wall and an internal phase encapsulated within the wall, the internal phase comprising electrically charged particles suspended in a suspending fluid and capable of moving through the fluid on application of an electric field to the electrophoretic medium.

32. An electro-optic display comprising first and second substrates, and a lamination adhesive layer and a layer of solid electro-optic material disposed between the first and second substrates, the lamination adhesive being characterized by any one or more of the following:

(a) having a volume resistivity, measured at 10° C., which does not change by a factor of more than about 3 after being held at 25° C. and 45 percent relative humidity for 1000 hours;

(b) having a peel strength from an electrode material in contact with the lamination adhesive of at least about 2 lb/inch;

(c) the volume resistivity of the lamination adhesive changes by a factor of less than about 10 within a range of 10 to 90 percent relative humidity and over a temperature range of 10 to 50° C.;

(d) the lamination adhesive has a thickness in the range of about 10 to about 20 μm;

(e) the lamination adhesive has a shear modulus at 120° C. of not more than about 1 megapascal;

(f) the product of the dielectric constant and the volume resistivity of the lamination adhesive is not greater than the product of the dielectric constant and the volume resistivity of the electro-optic medium within a range of 10 to 90 percent relative humidity and over a temperature range of 10 to 50° C.;

(g) comprising an ultra-violet stabilizer;

(h) comprising a light absorbing material.

33. An electro-optic display according to claim 32 wherein the lamination adhesive has a peel strength from an electrode material in contact with the lamination adhesive of at least about 4 lb/inch.

34. An electro-optic display according to claim 32 wherein the volume resistivity of the lamination adhesive changes by a factor of less than about 2 within a range of 10 to 90 percent relative humidity and over a temperature range of 10 to 50 C.

35. An electro-optic display according to claim 32 wherein the lamination adhesive has a thickness in the range of about 12 to about 18 $\mu$m.

36. An electro-optic display according to claim 35 wherein the lamination adhesive has a thickness in the range of about 13 to about 17 $\mu$m.

37. An electro-optic display according to claim 32 wherein the lamination adhesive has a shear modulus at 120° C. of not more than about 0.2 megaPascal.

38. An electro-optic display according to claim 32 wherein the ultra-violet stabilizer is a hindered amine light stabilizer.

39. An electro-optic display according to claim 32 wherein the light absorbing material comprises a pigment.

40. An electro-optic display according to claim 39 wherein the light absorbing material comprises at least one of carbon black and magnetite.

41. An electro-optic display according to claim 32 wherein the lamination adhesive has a volume resistivity of from about $10^8$ to about $10^{12}$ ohm cm at 25° C.

42. An electro-optic display according to claim 41 wherein the lamination adhesive has a volume resistivity of from about $10^9$ to about $10^{11}$ ohm cm at 25° C.

43. An electro-optic display according to claim 42 wherein the lamination adhesive has a volume resistivity of from about $3\times10^9$ to about $3\times10^{10}$ ohm cm at 25° C.

44. An electro-optic display according to claim 32 wherein the lamination adhesive is essentially free from aromatic organic materials.

45. A process for preparing an electro-optic display by providing a first subassembly comprising a solid electro-optic layer and a first substrate, providing a second subassembly comprising a second substrate, at least one of said subassemblies comprising an electrode, and laminating the two subassemblies to one another with a lamination adhesive so that the electro-optic layer is disposed between the first and second substrates, the lamination adhesive being characterized by any one or more of the following:

(a) having a volume resistivity, measured at 10° C., which does not change by a factor of more than about 3 after being held at 25° C. and 45 percent relative humidity for 1000 hours;

(b) having a peel strength from an electrode material in contact with the lamination adhesive of at least about 2 lb/inch;

(c) the volume resistivity of the lamination adhesive changes by a factor of less than about 10 within a range of 10 to 90 percent relative humidity and over a temperature range of 10 to 50° C.;

(d) the lamination adhesive has a thickness in the range of about 10 to about 20 $\mu$m;

(e) the lamination adhesive has a shear modulus at 120° C. of not more than about 1 megaPascal;

(f) the product of the dielectric constant and the volume resistivity of the lamination adhesive is not greater than the product of the dielectric constant and the volume resistivity of the electro-optic medium within a range of 10 to 90 percent relative humidity and over a temperature range of 10 to 50° C.;

(g) comprising an ultra-violet stabilizer;

(h) comprising a light absorbing material.

46. A process according to claim 45 wherein the lamination adhesive is applied to the electro-optic layer and the two subassemblies are thereafter laminated together.

47. A process according to claim 46 wherein the lamination adhesive is coated, in liquid or semi-solid form, on to a release sheet, converted to a solid layer on the release sheet, the combined release sheet and lamination adhesive are laminated to the electro-optic layer and thereafter the release sheet is removed from the lamination adhesive before the two subassemblies are laminated together.

48. An electrophoretic display comprising first and second substrates, and a lamination adhesive layer and a layer of electrophoretic material disposed between the first and second substrates, the electrophoretic material comprising a plurality of capsules, each capsule comprising a capsule wall and an internal phase encapsulated within the capsule wall, the internal phase comprising electrically charged particles suspended in a suspending fluid and capable of moving through the fluid on application of an electric field to the electrophoretic material, the lamination adhesive being characterized by any one or more of the following:

(a) the product of the dielectric constant and the volume resistivity of the lamination adhesive is from about 0.01 to about 100 times the product of the dielectric constant and the volume resistivity of the suspending fluid;

(b) the ratio of the dielectric constant of the lamination adhesive to the dielectric constant of the suspending fluid within the temperature range of from 10 to 50° C. does not vary from this ratio at 25° C. by more than about 2 percent;

(c) the ratio of the volume resistivity of the lamination adhesive to the volume resistivity of the suspending fluid within the temperature range of from 10 to 50° C. does not vary from this ratio at 25° C. by more than a factor of about 100;

(d) the solubility of the suspending fluid in the lamination adhesive does not exceed about 1 percent weight/weight over the range of 10 to 50° C.;

(e) being substantially free from mobile species.

49. An electrophoretic display according to claim 48 wherein the product of the dielectric constant and the volume resistivity of the lamination adhesive is from about 0.1 to about 10 times the product of the dielectric constant and the volume resistivity of the suspending fluid.

50. An electrophoretic display according to claim 49 wherein the product of the dielectric constant and the volume resistivity of the lamination adhesive is from about 0.5 to about 2 times the product of the dielectric constant and the volume resistivity of the suspending fluid.

51. An electrophoretic display according to claim 48 wherein the ratio of the dielectric constant of the lamination adhesive to the dielectric constant of the suspending fluid within the temperature range of from 10 to 50° C. does not vary from this ratio at 25° C. by more than about 1 percent.

52. An electrophoretic display according to claim 48 wherein the ratio of the volume resistivity of the lamination adhesive to the volume resistivity of the suspending fluid within the temperature range of from 10 to 50° C. does not vary from this ratio at 25° C. by more than a factor of about 10.

53. An electrophoretic display according to claim 52 wherein the ratio of the volume resistivity of the lamination adhesive to the volume resistivity of the suspending fluid within the temperature range of from 10 to 50° C. does not vary from this ratio at 25° C. by more than a factor of about 2.

54. An electrophoretic display according to claim 53 wherein the ratio of the volume resistivity of the lamination adhesive to the volume resistivity of the suspending fluid within the temperature range of from 10 to 50° C. does not vary from this ratio at 25° C. by more than about 10 percent.

55. An electrophoretic display according to claim 48 wherein the solubility of the suspending fluid in the lamination adhesive does not exceed about 0.1 percent weight/weight over the range of 10 to 50° C.

56. An electrophoretic display according to claim 55 wherein the solubility of the suspending fluid in the lamination adhesive does not exceed about 0.01 percent weight/weight over the range of 10 to 50° C.

57. An electrophoretic display according to claim 48 wherein the lamination adhesive is substantially free from mobile ionic species.

58. An electrophoretic display according to claim 48 wherein the lamination adhesive is substantially free from surfactants.

59. An electrophoretic display according to claim 48 wherein the lamination adhesive is substantially free from organic solvents.

60. An electrophoretic display according to claim 48 wherein the lamination adhesive is substantially free from biocides.

61. An electrophoretic display according to claim 48 wherein the lamination adhesive is a polymer substantially free from free monomer.

62. An electrophoretic display according to claim 48 wherein the lamination adhesive comprises at least one polyurethane.

63. A process for preparing an electrophoretic display by providing a first subassembly comprising a first substrate and a layer of an electrophoretic medium comprising a plurality of capsules, each capsule comprising a capsule wall and an internal phase encapsulated within the capsule wall, the internal phase comprising electrically charged particles suspended in a suspending fluid and capable of moving through the fluid on application of an electric field to the electrophoretic medium, providing a second subassembly comprising a second substrate, at least one of said subassemblies comprising an electrode, and laminating the two subassemblies to one another with a lamination adhesive so that the electro-optic layer is disposed between the first and second substrates, the lamination adhesive being characterized by any one or more of the following:
   (a) the product of the dielectric constant and the volume resistivity of the lamination adhesive is from about 0.01 to about 100 times the product of the dielectric constant and the volume resistivity of the suspending fluid;
   (b) the ratio of the dielectric constant of the lamination adhesive to the dielectric constant of the suspending fluid within the temperature over the range of from 10 to 50° C. does not vary from this ratio at 25° C. by more than about 2 percent;
   (c) the ratio of the volume resistivity of the lamination adhesive to the volume resistivity of the suspending fluid within the temperature over the range of from 10 to 50° C. does not vary from this ratio at 25° C. by more than a factor of about 100;
   (d) the solubility of the suspending fluid in the lamination adhesive does not exceed about 1 percent weight/weight over the range of 10 to 50° C.;
   (e) being substantially free from mobile species.

64. A process according to claim 21 wherein the lamination adhesive is applied to the layer of electrophoretic medium and the two subassemblies are thereafter laminated together.

65. A process according to claim 64 wherein the lamination adhesive is coated, in liquid or semi-solid form, on to a release sheet, converted to a solid layer on the release sheet, the combined release sheet and lamination adhesive are laminated to the layer of electrophoretic medium, and thereafter the release sheet is removed from the lamination adhesive before the two subassemblies are laminated together.

66. A microcell electrophoretic display comprising a substrate having a plurality of closed cavities formed therein, said cavities being at least partially filled with a electrophoretic medium comprising a plurality of electrically charged particles suspended in a suspending fluid and capable of moving therethrough on application of an electric field to the electrophoretic medium, the microcell electrophoretic display further comprising at least one electrode and a layer of lamination adhesive disposed between the cavities and the electrode, the lamination adhesive being characterized by any one or more of the following:
   (a) having a volume resistivity, measured at 10° C., which does not change by a factor of more than about 3 after being held at 25° C. and 45 percent relative humidity for 1000 hours;
   (b) having a peel strength from an electrode material in contact with the lamination adhesive of at least about 2 lb/inch;
   (c) the volume resistivity of the lamination adhesive changes by a factor of less than about 10 within a range of 10 to 90 percent relative humidity and over a temperature range of 10 to 50° C.;
   (d) the lamination adhesive has a thickness in the range of about 10 to about 20 $\mu$m;
   (e) the lamination adhesive has a shear modulus at 120° C. of not more than about 1 megaPascal;
   (f) the product of the dielectric constant and the volume resistivity of the lamination adhesive is not greater than the product of the dielectric constant and the volume resistivity of the electro-optic medium within a range of 10 to 90 percent relative humidity and over a temperature range of 10 to 50° C.;
   (g) comprising an ultra-violet stabilizer;
   (h) comprising a light absorbing material;
   (i) the product of the dielectric constant and the volume resistivity of the lamination adhesive is from about 0.01 to about 100 times the product of the dielectric constant and the volume resistivity of the suspending fluid;
   (j) the ratio of the dielectric constant of the lamination adhesive to the dielectric constant of the suspending fluid within the temperature over the range of from 10 to 50° C. does not vary from this ratio at 25° C. by more than about 2 percent;
   (k) the ratio of the volume resistivity of the lamination adhesive to the volume resistivity of the suspending fluid within the temperature over the range of from 10 to 50° C. does not vary from this ratio at 25° C. by more than a factor of about 100;
   (l) the solubility of the suspending fluid in the lamination adhesive does not exceed about 1 percent weight/weight over the range of 10 to 50° C.;
   (m) being substantially free from mobile species.

* * * * *